(12) United States Patent
Aso et al.

(10) Patent No.: US 8,891,432 B2
(45) Date of Patent: Nov. 18, 2014

(54) ROUTING METHOD, ROUTING SYSTEM, MOBILE NODE, HOME AGENT, AND HOME BASE STATION

(75) Inventors: Keigo Aso, Kanagawa (JP); Shinkichi Ikeda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 255 days.

(21) Appl. No.: 13/201,922

(22) PCT Filed: Mar. 24, 2010

(86) PCT No.: PCT/JP2010/002089
§ 371 (c)(1),
(2), (4) Date: Aug. 17, 2011

(87) PCT Pub. No.: WO2010/109862
PCT Pub. Date: Sep. 30, 2010

(65) Prior Publication Data
US 2012/0026933 A1 Feb. 2, 2012

(30) Foreign Application Priority Data

Mar. 27, 2009 (JP) .................................. 2009-079713
Feb. 17, 2010 (JP) .................................. 2010-032607

(51) Int. Cl.
| | | |
|---|---|---|
| H04B 7/14 | (2006.01) | |
| H04W 60/00 | (2009.01) | |
| H04L 12/54 | (2013.01) | |
| H04W 40/02 | (2009.01) | |
| H04L 12/707 | (2013.01) | |
| H04W 80/04 | (2009.01) | |

(52) U.S. Cl.
CPC ......... *H04W 60/005* (2013.01); *H04L 12/5692* (2013.01); *H04L 12/5695* (2013.01); *H04W 40/02* (2013.01); *H04L 45/22* (2013.01); *H04W 80/04* (2013.01)
USPC .......................................... 370/315; 370/351

(58) Field of Classification Search
USPC ........................... 709/222; 370/338, 315, 254
See application file for complete search history.

(56) References Cited

U.S. PATENT DOCUMENTS

2006/0018273 A1 1/2006 Yamada et al.
2007/0140256 A1 6/2007 Yaqub
(Continued)

FOREIGN PATENT DOCUMENTS

JP 2006-33541 A 2/2006
JP 2009-500876 A 1/2009
(Continued)

OTHER PUBLICATIONS

D. Johnson, et al., "Mobility Support in IPv6", RFC3775, Jun. 2004.
(Continued)

*Primary Examiner* — Andrew Lai
*Assistant Examiner* — Jamaal Henson
(74) *Attorney, Agent, or Firm* — Pearne & Gordon LLP

(57) ABSTRACT

Disclosed in a technique for registering, with a home agent, a routing rule for specifying packets destined to a second address generated from a home prefix as well as a home address and/or flow destination interfaces without increasing the number of messages. According to this technique, when a UE 10 is communicating (flow 1 and flow 2) with a CN 17 using the HoA, a routing rule indicating, for example, that flow 1 of packets destined to a HNP address is forwarded to a 3GPP interface IF1 and flow 2 of packets destined to the HNP address is forwarded to a WLAN interface IF2 is registered with a P-GW 13 through a routing rule registration message 21 such as a BU message at the time of starting simultaneous connections of the interfaces IF1 and IF2.

28 Claims, 21 Drawing Sheets

(56) References Cited

U.S. PATENT DOCUMENTS

| | | | |
|---|---|---|---|
| 2008/0186897 A1* | 8/2008 | Rune et al. | 370/315 |
| 2008/0256220 A1* | 10/2008 | Bachmann et al. | 709/222 |
| 2009/0116463 A1 | 5/2009 | Hirano et al. | |
| 2010/0220731 A1* | 9/2010 | Diab et al. | 370/395.53 |

FOREIGN PATENT DOCUMENTS

| | | |
|---|---|---|
| WO | 2006/093288 A1 | 9/2006 |
| WO | 2007/129199 A1 | 11/2007 |
| WO | 2009/098876 A1 | 8/2009 |

OTHER PUBLICATIONS

R. Wakikawa, et al., "Multiple Care-of Addresses Registration", draft-ietf-monami6-multiplecoa-05.txt, Jan. 28, 2008.

S. Gundavelli, et al., "Proxy Mobile IPv6", RFC5213, Aug. 2008.

3GPP TS 23.402 V 8.4.1, "3rd Generation Partnership Project; Technical Specification Group Services and System Aspects; Architecture enhancements for non-3GPP accesses", Jan. 2009.

International Search Report for PCT/JP2010/002089 dated Jun. 22, 2010.

R. Wakikawa, et al., "Multiple Care-of Addresses Registration", draft-ietf-monami6-multiplecoa-12.txt, Mar. 6, 2009.

\* cited by examiner

FIG. 8
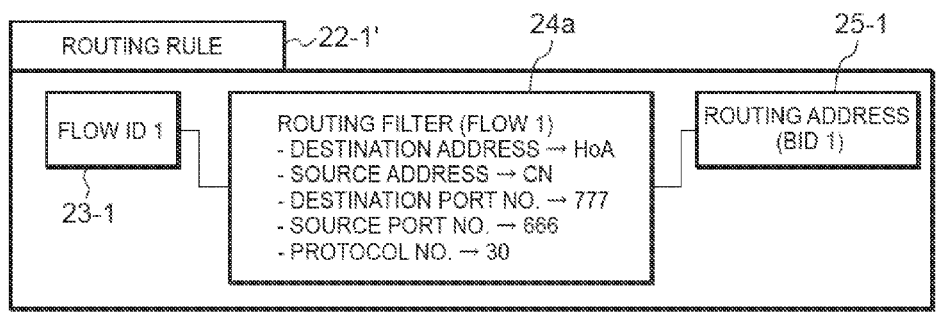
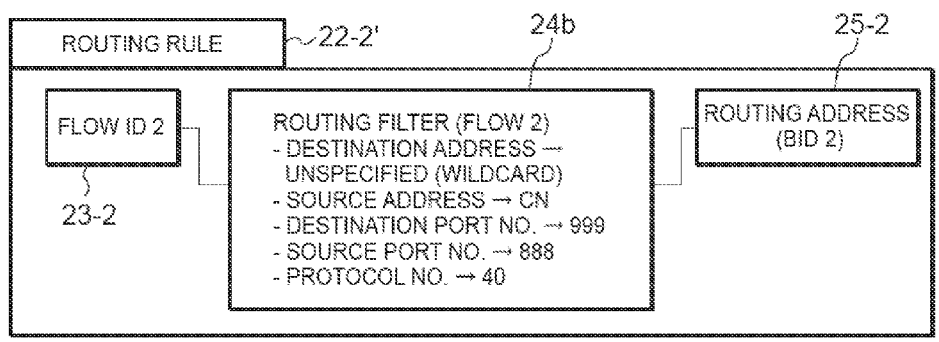

ROUTING METHOD, ROUTING SYSTEM, MOBILE NODE, HOME AGENT, AND HOME BASE STATION

TECHNICAL FIELD

The present invention relates to a routing method, a routing system, a mobile node, and a home agent when the mobile node having multiple interfaces uses a second address generated from a home network prefix in addition to a home address generated from the home network prefix.

The present invention also relates to a routing method in which a routing device that has received packets sent from a mobile node or destined to the mobile node forwards the packets selectively to a first path side or a second path side according to a routing rule in which the forwarding destination of the flow is specified.

Further, the present invention relates to a routing method, a routing system, a mobile node, and a home base station of the mobile node, where the home base station that has received packets sent from the mobile node forwards the packets selectively to a first path side or a second path side according to a routing rule in which the forwarding destination of the flow is specified.

BACKGROUND ART

A mobile node (hereinafter MN) using mobile IP (see Non-Patent Document 1 cited below, which is also called CMIP (client mobile IP)) registers a care-of address (Hereinafter CoA) as a destination address with a home agent (hereinafter HA) managing its home address (HoA) or with a correspondent node (hereinafter CN) to make a request for forwarding of packets destined to the HoA. If the MN can register two or more CoAs at the same time in association with one HoA, the MN having multiple interfaces will register a CoA assigned to each interface with the HA or the like to enable instantaneous switching from one CoA to another to be used according to the state of each individual interface. In Non-Patent Document 2 cited below, a technique in which the MN registers, with the HA, multiple CoAs in association with one HoA is described. Further, in proxy mobile IP (see Non-Patent Document 3 cited below, which is abbreviated as PMIP), since a MAG (Mobility Anchor Gateway) as a proxy node of the MN updates MN position information in place of the MN, the MN does not need to perform mobility management.

In 3GPP (Third Generation Partnership Project), a method of using a cell-phone unit (UE: User Equipment) provided with both a 3GPP interface (to be connected to a 3GPP network) and a WLAN interface or a WiMAX interface (to be connected to a Non-3GPP network) has been contemplated (Non-Patent Document 4) to enable the UE to hand over between the 3GPP network and the Non-3GPP network. The 3GPP network is a home network for the UE. In the network, a PDN gateway (hereinafter P-GW) exists as a gateway located between the network and a PDN (Packet Data Network) to provide various services to the UE, playing a role as a home agent for forwarding packets destined to the UE. The UE to be attached to the 3GPP network and the P-GW are connected by a connection established by GTP (General packet radio service Tunneling Protocol) or PMIP (Proxy Mobile IP) through a serving gateway (hereinafter S-GW). The UE generates an IP address from a home network prefix (hereinafter HNP) assigned from the P-GW, and uses the IP address as a home address (HoA). At this time, the S-GW has a role as the proxy node of the UE.

On the other hand, when the UE hands over from the 3GPP network to attach to the Non-3GPP network, if the Non-3GPP network is a trusted network (Trusted Non-3GPP network), the UE and the P-GW are connected by a connection established by PMIP or CMIP or MIPv4 through an AGW (Access Gateway), while if the Non-3GPP network is an untrusted network (Untrusted Non-3GPP network), they are connected by PMIP or CMIP through an ePDG (evolved Packet Data Gateway).

When PMIP is used in the Non-3GPP network, since HNP is assigned in an Attach Procedure performed with the AGW or the ePDG upon attachment to the network, the same address as that used upon attachment to the 3GPP network can be continuously used.

On the other hand, when CMIP is used in the Non-3GPP network, since a care-of address is assigned from the AGW or the ePDG, the UE sends a binding update (BU) message to the P-GW existing in the 3GPP network to associate the care-of address with the home address in order to generate a connection. Like in the case of PMIP, the home address (HoA) when CMIP is used in the Non-3GPP network is automatically generated using a HNP assigned in the Attach Procedure performed upon attachment to the Non-3GPP network. Since the assigned HNP is a value unique to each UE, the UE can generate any address other than the HoA from the HNP. This address other than the HoA is called the HNP address below.

Since the P-GW determines whether a packet is destined to the UE based on whether the destination address of the packet is the address generated from the HNP, all packets destined to the address generated by using the HNP are handled as packets destined to the UE. Therefore, the packets destined to the HNP address are forwarded to the UE according to a binding cache (BC) for the HoA in the same manner as the packets destined to the HoA. For example, when an address acquired in the Non-3GPP network is registered as a CoA, the CoA is also used by the P-GW as the forwarding destination of the packets destined to the HNP address.

In 3GPP, a case where the 3GPP interface and the Non-3GPP interface of the UE are connected to the respective networks at the same time has also been contemplated. In this case, since the UE and the P-GW use two interfaces at the same time, either the 3G interface side or the Non-3G interface side can be selected according to the type of a flow forwarded to the UE, enabling efficient use of a band for each connection. When CMIP is used on the Non-3GPP side and the connection destination of both interfaces is the same P-GW, the UE can use the same home prefix. In this case, the P-GW holds two BCs, i.e., a BC (HoA-CoA) (hereinafter, foreign binding), in which the CoA is associated with the HoA as a care-of address, and a BC (HoA-HoA) (hereinafter called home binding), in which the HoA is associated with the HoA as a care-of address. The foreign binding indicates the Non-3GPP interface of the UE as a forwarding destination, while the home binding indicates the 3GPP interface of the UE as the forwarding destination.

If these two BCs are registered with the P-GW, the P-GW can select either the 3GPP side or the Non-3GPP side as the forwarding destination of packets destined to the UE. The determination of which to select is made according to a routing rule for the UE. The routing rule can be defined and registered by the UE, or defined by an operator as well. Handling of the HNP address upon simultaneous connections is the same as that of the above-mentioned HNP address, and the BC for the HoA is also applied to the HNP address. Further, in this case, the routing rule registered for the HoA is also taken over together with the BC. Therefore, for example, when a routing rule for flows of a video conference between the UE and a CN, which indicates that audio flows are forwarded to the Non-3GPP side and video flows are forwarded to the 3GPP side, is registered with the P-GW, audio flows and video flows destined to the HNP address as well as audio flows and video flows destined to the HoA are forwarded according to the same routing rule.

PRIOR ART DOCUMENT

Non-Patent Document

Non-Patent Document 1: D. Johnson, C. Perkins, J. Arkko, "Mobility Support in IPv6," RFC3775, June 2004.
Non-Patent Document 2: R. Wakikawa, T. Ernst, K. Nagami, V. Devarapalli, "Multiple Care-of Addresses Registration," draft-ietf-monami6-multiplecoa-05.txt, January 2008.
Non-Patent Document 3: S. Gundavelli, K. Leung, V. Devarapalli, K. Chowdhury, B. Patil, "Proxy Mobile IPv6," RFC5213, August 2008.
Non-Patent Document 4: 3GPP TS 23.402 V8.4.1, January 2009.

However, when the HNP address is equated with the HoA, since the P-GW forwards, to the UE, all packets destined to the HNP address generated by the CN using the HNP of the UE, the UE ends up receiving unintended packets destined to the IP address all of a sudden. This means that the CN can make any packet delivered to the UE as long as the CN knows only the HNP without knowing the HoA of the UE, causing a security problem that the address of the UE cannot remain secret.

Suppose that when the UE is subjected to DoS (Denial of Service) attacks against the HoA, the UE stops the use of the HoA. In this case, since it is possible to attack another HNP address, the DoS attacks cannot be avoided even if the use of the HoA is stopped and the address to be used is switched to the HNP address. Further, if the CN uses many HNP addresses arbitrarily generated to send packets to the UE, the number of HNP addresses that the UE has to manage increases independently of the intention of the UE, causing a problem of increasing the load on the UE in terms of address management. In addition, it is not always true that the same routing rule as for flows using the HoA can be applied to flows using the HNP address. Therefore, if the routing rule registered for the HoA is applied as-is to the HNP address, there also arises another problem that flows are forwarded to an undesired interface.

To solve the above problems, it can be considered a method in which when the UE uses the HNP address as well as the HoA, a new routing rule for specifying a packet destined to the HNP address and a flow forwarding destination interface is registered with the P-GW. However, since this method requires transmission of a new routing rule registration message from the UE to the P-GW in addition to a BU message for associating the care-of address with the home address, there arises a new problem that the number of messages increases.

SUMMARY OF THE INVENTION

In view of the above problems, it is a first object of the present invention to provide a routing method, a routing system, a mobile node, and a home agent, capable of registering, with the home agent, a routing rule for specifying a packet destined to a second address and a flow forwarding destination interface without increasing the number of messages when the mobile node having multiple interfaces uses the second address generated from a home network prefix in addition to a home address generated from the home network prefix.

It is also the first object of the present invention to provide a routing method, a routing system, a mobile node, and a home agent, capable of prohibiting the above packet destined to the second address from being forwarded to the mobile node.

Further, it is a second object of the present invention to provide a routing method capable of setting an application condition of a routing rule when a routing device that has received a packet sent from a mobile node or a packet destined to the mobile node forwards the packet selectively to a first path side or a second path side according to the routing rule in which the forwarding destination of the flow is specified.

In addition, it is a third object of the present invention to provide a routing method, a routing system, a mobile node, and a home base station, capable of setting an application condition of a routing rule when the home base station that has received a packet sent from the mobile node forwards the packet selectively to a first path side or a second path side according to the routing rule in which the forwarding destination of the flow is specified.

In order to attain the above first object, the present invention provides a routing method when a mobile node having a plurality of interfaces uses a second address generated from a home network prefix in addition to a home address generated from the home network prefix, the method comprising:

a step of causing the mobile node to register, with a home agent of the mobile node at the time of starting simultaneous connections, a routing rule for specifying a packet destined to the second address and/or a flow forwarding destination interface of the packet when two or more of the interfaces are connected to respective networks at the same time; and a step of causing the home agent to forward the packet destined to the second address and/or a flow of the packet to the forwarding destination interface based on the routing rule.

Also, in order to attain the above first object, the present invention provides a routing system when a mobile node having a plurality of interfaces uses a second address generated from a home network prefix in addition to a home address generated from the home network prefix, the system comprising:

means for causing the mobile node to register, with a home agent of the mobile node at the time of starting simultaneous connections, a routing rule for specifying a packet destined to the second address and/or a flow forwarding destination interface of the packet when two or more of the interfaces are connected to respective networks at the same time; and means for causing the home agent to forward the packet destined to the second address and/or a flow of the packet to the forwarding destination interface based on the routing rule.

Further, in order to attain the above first object, the present invention provides a mobile node in a routing system when the mobile node having a plurality of interfaces uses a second address generated from a home network prefix in addition to a home address generated from the home network prefix, the mobile node comprising means for registering, with a home agent of the mobile node at the time of starting simultaneous connections, a routing rule for specifying a packet destined to the second address and/or a flow forwarding destination interface of the packet when two or more of the interfaces are connected to respective networks at the same time.

Further, in order to attain the above first object, the present invention provides a home agent of a mobile node in a routing system when the mobile node having a plurality of interfaces uses a second address generated from a home network prefix in addition to a home address generated from the home network prefix, the home agent comprising:

means for receiving, from the mobile node at the time of starting simultaneous connections, and registering a routing rule for specifying a packet destined to the second address and/or a flow forwarding destination interface of the packet when two or more of the interfaces are connected to respective networks at the same time; and means for forwarding the packet destined to the second address and/or a flow of the packet to the forwarding destination interface based on the routing rule.

According to this structure, since the mobile node registers a routing rule for specifying a packet destined to second address and/or a flow forwarding destination interface of the packet with the home agent at the time of starting simultaneous connections using a BU message, for example, when two or more interfaces are connected to respective networks at the same time, the routing rule can be registered with the home agent without increasing the number of messages.

In order to attain the above second object, the present invention provides a routing method in which a routing device that has received a packet sent from a mobile node or a packet destined to the mobile node forwards the packet selectively to a first path side or a second path side according to a routing rule in which the forwarding destination of the flow is specified, the method comprising:

a step of causing the mobile node to register, with the routing device together with the routing rule, an application condition for specifying whether the routing rule is applied to a packet related to the flow whose address acquired after registration of the routing rule is a source address or a destination address; and a step of causing the routing device to forward the received packet selectively to the first path side or the second path side according to the routing rule only when the application condition permits the routing rule after the packet related to the flow whose address is the source address or the destination address is received.

According to this structure, an application condition of a routing rule can be set when the routing device that has received a packet sent from the mobile node or a packet destined to the mobile node forwards the packet selectively to a first path side or second path side according to the routing rule in which the forwarding destination of the flow is specified.

In order to attain the above third object, the present invention provides a routing method in which a home base station that has received a packet sent from a mobile node forwards the packet selectively to a first path side or a second path side according to a routing rule in which the forwarding destination of the flow is specified, the method comprising:

a step of causing the mobile node to register, with the home base station together with the routing rule, an application condition for specifying whether the routing rule is applied to a packet related to the flow whose address acquired after registration of the routing rule is a source address;

a step of causing the home base station to forward the received packet selectively to the first path side or the second path side according to the routing rule only when the application condition permits the routing rule after the packet related to the flow whose address is the source address is received; and a step of causing the mobile node to register, with the home base station, a new routing rule to be applied to the packet related to the flow whose address is the source address when the application condition does not permit the application of the routing rule.

Also, in order to attain the above third object, the present invention provides routing system including a mobile node sending a packet related to a flow, and a home base station for receiving the packet and forwarding the packet selectively to a first path side via a home network of the mobile node or a second path side without taking a route via the home network according to a routing rule in which the forwarding destination of the flow is specified, the system comprising:

first registration means for causing the mobile node to register, with the home base station together with the routing rule, an application condition for specifying whether the routing rule is applied to a packet related to the flow whose address acquired after registration of the routing rule is a source address;

forwarding means for causing the home base station to forward the received packet selectively to the first path side or the second path side according to the routing rule only when the application condition permits the routing rule after the packet related to the flow whose address is the source address is received; and second registration means for causing the mobile node to register, with the home base station, a new routing rule to be applied to the packet related to the flow whose address is the source address when the application condition does not permit the application of the routing rule.

Further, in order to attain the above third object, the present invention provides a mobile node for registering, with a home base station, a routing rule for specifying the source address of a packet related to a flow to send the packet, the mobile node comprising:

first registration means for registering, with the home base station together with the routing rule, an application condition for specifying whether the routing rule is applied to a packet related to the flow whose address acquired after registration of the routing rule is the source address; and second registration means for registering, with the home base station, a new routing rule to be applied to the packet related to the flow whose address is the source address when the application condition does not permit the application of the routing rule.

In addition, in order to attain the above third object, the present invention provides a home base station for receiving a packet related to a flow sent from a mobile node and forwarding the packet selectively to a first path side via a home network of the mobile node or a second path side without taking a route via the home network according to a routing rule in which the forwarding destination of the flow is specified, the home base station comprising:

registration accepting means for accepting, along with the registration of the routing rule, registration of an application condition for specifying whether the routing rule is applied to the packet related to the flow whose address acquired after the mobile node registers the routing rule is the source address; and forwarding means which, when receiving the packet related to the flow whose address is the source address, forwards the received packet selectively to the first path side or the second path side according to the routing rule only when the application condition permits the routing rule.

According to this structure, an application condition of a routing rule can be set when the home base station that has received a packet sent from the mobile node forwards the packet selectively to a first path side or a second path side according to the routing rule in which the forwarding destination of the flow is specified.

According to the present invention, when the mobile node having multiple interfaces uses a second address generated from a home network prefix in addition to a home address generated from the home network prefix, a routing rule for specifying a packet destined to the second address and/or a flow forwarding destination interface can be registered with the home agent without increasing the number of messages.

Also, according to the present invention, an application condition of a routing rule can be set when the routing device that has received a packet sent from the mobile node or a packet destined to the mobile node forwards the packet selectively to a first path side or second path side according to the routing rule in which the forwarding destination of the flow is specified.

Further, according to the present invention, an application condition of a routing rule can be set when the home base station that has received a packet sent from the mobile node forwards the packet selectively to a first path side or a second path side according to the routing rule in which the forwarding destination of the flow is specified.

BRIEF DESCRIPTION OF THE DRAWINGS

[FIG. 8] It is an explanatory drawing showing routing rules sent through the routing rule registration messages of the FIG. 6 and FIG. 7.

DESCRIPTION OF EMBODIMENTS

Preferred embodiments of the present invention will now be described with reference to the accompanying drawings.

First Embodiment

Figure 1:
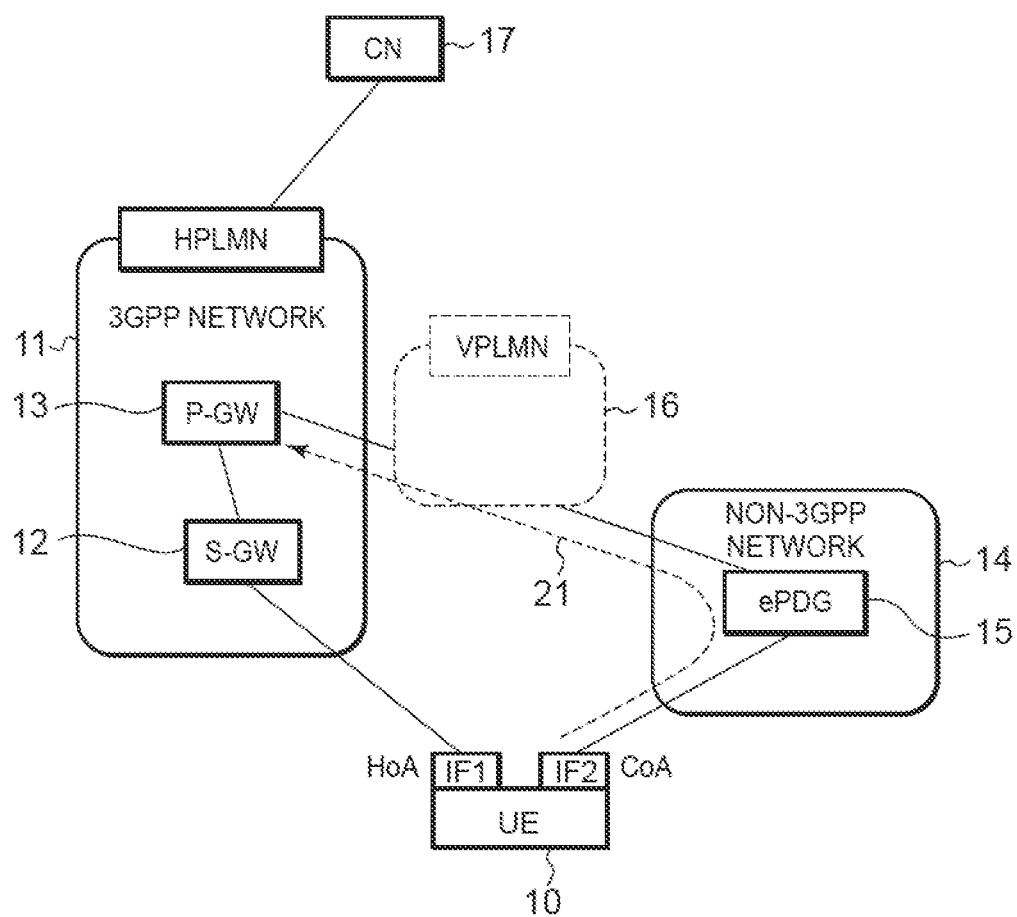
[FIG. 1] It is a diagram showing a network configuration for describing a routing method of a first embodiment of the present invention.

FIG. 1 is a diagram showing a network configuration in the first embodiment of the present invention. A UE 10 as a mobile node is provided with a 3GPP interface (cellular interface) IF1 and a WLAN interface IF2 as a Non-3GPP interface. The Non-3GPP interface may also be a WiMAX (Registered Trademark) interface or an HRPD (High Rate Packet Data) interface. The 3GPP interface IF1 is connected to a 3GPP network 11 (home network) as HPLMN (Home Public Land Mobile Network) for the UE 10. Then, a PMIP connection is established with a P-GW 13 as the home agent of the UE 10 through an S-GW 12 as a proxy node of the UE 10. In this connection, a HoA is used. On the other hand, the WLAN interface IF2 is connected to the P-GW 13 via an Untrusted Non-3GPP network 14 and VPLMN (Visited Public Land Mobile Network) 16. In this connection, a CoA is used. Further, the UE 10 sends the P-GW 13 a BU message for registering the CoA to establish a connection with the P-GW 13 through an ePDG 15.

<UE>

Figure 2:
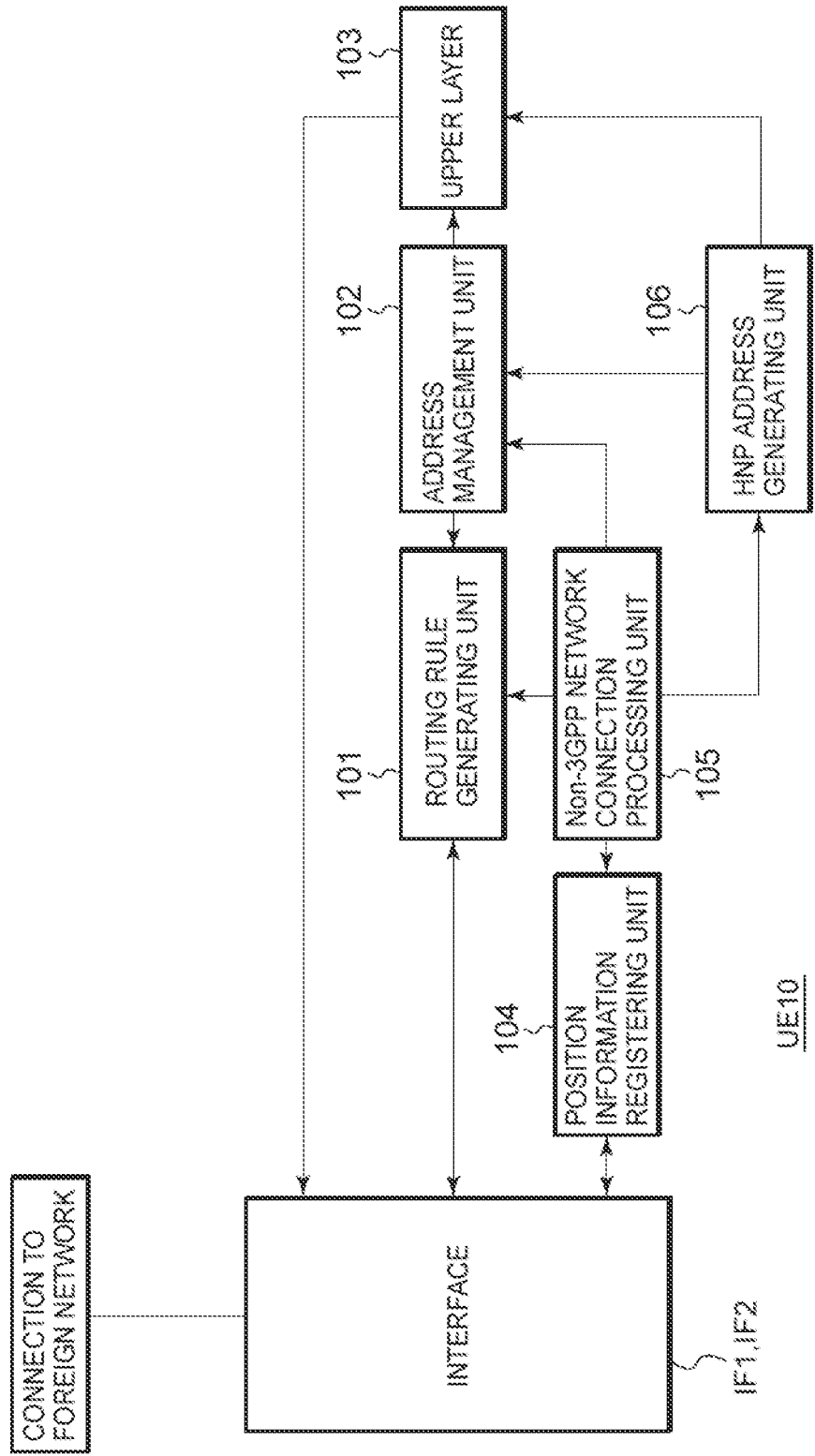
[FIG. 2] It is a block diagram showing user equipment of FIG. 1 in detail.

FIG. 2 shows a block diagram of the UE 10. The UE 10 has the 3GPP interface IF1, the Non-3GPP interface (WLAN interface IF2), a routing rule generating unit 101, an address management unit 102, an upper layer 103, a position information registering unit 104, a Non-3GPP network connection processing unit 105, and a HNP address generating unit 106. The HNP address generating unit 106 receives an instruction from the Non-3GPP network connection processing unit 105 or the upper layer 103 to generate, using a HNP, an address (HNP address) different from the home address (HoA). Upon generation of the HNP address, a HNP address different from the HoA held in the address management unit 102 and HNP addresses already used is generated. Further, the HNP address generating unit 106 instructs the address management unit 102 to hold the generated HNP address.

The upper layer 103 includes functions executed by higher-level layers than the IP layer, such as TCP (Transmission Control Protocol)/UDP (User Datagram Protocol) layers and applications. When starting communication with a CN 17, the upper layer 103 refers to the address management unit 102 to select an address used for communication with the CN 17. When a HNP address is used for communication with the CN 17 instead of the HoA, the upper layer 103 instructs the HNP address generating unit 106 to generate a HNP address. If an available HNP address is already held in the address management unit 102, the upper layer 103 can select the address. The upper layer 103 uses the HNP address acquired from the HNP address generating unit 106 as the source address of packets destined to the CN 17. The packets using the HNP address may be sent from either the 3GPP interface IF1 or the WLAN interface IF2.

The Non-3GPP network connection processing unit 105 performs an attach procedure required when the WLAN interface IF2 connects to the Non-3GPP network 14. In this processing, signaling exchange for establishing a connection between the UE 10 and the P-GW 13, generation of a CoA, generation of SA (Security Association) with the P-GW 13, acquisition of a HNP, generation of the HoA, registration of position information, etc. are performed. The Non-3GPP network connection processing unit 105 registers the generated HoA and CoA in the address management unit 102, and passes them to the position information registering unit 104 to instruct the P-GW 13 to register the position information. If it is desired to perform communication using a HNP address different from the HoA within the Non-3GPP network 14 to which the UE 10 is attached, the Non-3GPP network connection processing unit 105 instructs the HNP address generating unit 106 to generate a HNP address.

The upper layer 103 and the Non-3GPP network connection processing unit 105 select use of a HNP address in a case where the use of the HNP address temporarily for a specific CN 17 ensures that the HoA remains secret, in a case where it is desired to identify a flow destined to the UE 10 just by checking for the destination address of packets, and the like. Further, there are cases where the Non-3GPP network 14 to which the UE 10 is attached is an Untrusted network for the UE 10, and where it is undesired to give out the HoA because sufficient security is not ensured. Further, based on a policy acquired from an information server such as ANDSF (Access Network Discovery and Selection Function), it may also be determined whether to use the HNP address. For example, when a specific flow is started, or when communication with a specific correspondent is started, or when the UE 10 is attached to a specific network (Untrusted network, such as a network as a roaming destination), the use of a HNP address is specified as a policy.

The position information registering unit 104 receives an instruction from the Non-3GPP network connection processing unit 105 to instruct the WLAN interface IF2 to send a BU message to the P-GW 13 in order to associate the CoA of the WLAN interface IF2 with the HoA. When the WLAN interface IF2 is connected to the Non-3GPP network 14, if the 3GPP interface IF1 is already connected to the 3GPP network 11, both the HoA assigned to the 3GPP interface IF1 and the CoA assigned to the WLAN interface IF2 are included as forwarding destination addresses to be registered through the BU message.

Figure 10:
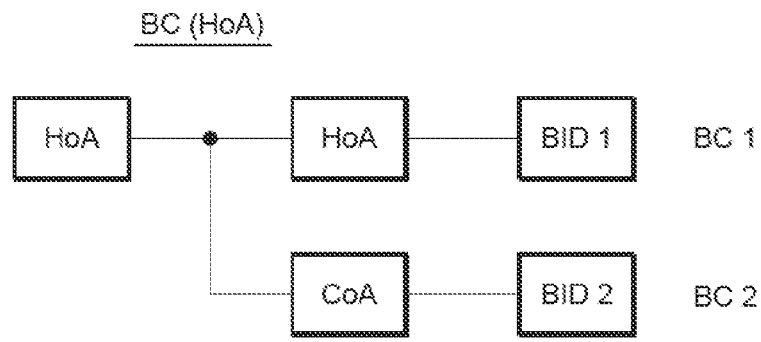
[FIG. 10] It is an explanatory drawing showing an example of a binding cache (BC) for a home address (HoA) registered in a UE information management unit of FIG. 9.

Both the HoA of the 3GPP interface IF1 and the CoA of the WLAN interface IF2 are registered as forwarding destination addresses, and this enables the P-GW 13 to recognize that packets destined to the UE 10 can be forwarded to either the 3GPP interface IF1 or the WLAN interface IF2. In this case, two BCs, namely BC 1 for holding the HoA as a forwarding destination address and BC 2 for holding the CoA as a forwarding destination address, are generated in the P-GW 13 as shown in FIG. 10 (to be described later). BID 1 and BID 2 as BIDs (Binding Identifiers) assigned to the BCs 1 and 2 respectively corresponding to the 3GPP interface IF1 and the WLAN interface IF2 are added to the BU message.

The address management unit 102 receives an instruction from the position information registering unit 104 to hold the position information registered with the P-GW 13. The address management unit 102 also receives instructions from the HNP address generating unit 106 and the Non-3GPP network connection processing unit 105 to hold the generated HNP address and HoA.

The routing rule generating unit 101 defines a routing rule for specifying to which forwarding destination each flow on which communication is being performed using the HoA is to be forwarded, and registers it with the P-GW 13. The routing rule defined consists mainly of a flow ID, information (routing filter) for identifying the flow, an address (routing address) as the forwarding destination of the flow, and applicability information indicative of whether the routing rule is to be applied to a HNP address. The flow ID is an identifier assigned to each routing rule. The routing filter is composed of a combination of some or all of a destination address of packets, a destination port number, a source port number, and a protocol number.

For example, when the UE 10 is communicating with the CN 17 using the HoA (flow 1 and flow 2), a routing rule registration message 21 is sent to the P-GW 13 to register a routing rule 1 indicating that flow 1 of packets destined to the HoA is forwarded to the 3GPP interface IF1 and a routing rule 2 indicating that flow 2 of packets destined to the HoA is forwarded to the WLAN interface IF2. At this time, when it is determined that the routing rule 2 is a routing rule to be applied to a HNP address, a message with information indicative of being applicable added is sent as applicability information for routing rule 2. In the description of the routing filter here, packets received from the CN 17 are assumed, but it can also be applied to packets sent from the UE 10. In this case, the source address in the routing filter corresponds to the destination address of the packets sent from the UE 10, and the source port number corresponds to the destination port number. As for the packets sent from the UE 10, the destination address and the destination port number indicate the source address and the source port number, respectively.

It is checked whether actual packets match the information in this routing filter to identify the flow. The information for identifying the flow may also include other information such as the flow ID and the packet size. Either the BID 1 referring to the BC 1 corresponding to the 3GPP interface IF1 or the BID 2 referring to the BC 2 corresponding to the WLAN interface IF2 is specified in the routing address. When the BID 1 is set, the address (HoA) of the 3GPP interface IF1 is used as the forwarding destination, while when the BID 2 is set, the address (CoA) of the WLAN interface IF2 is used as the forwarding destination. The HoA or the CoA may be directly specified instead of the BID.

Figure 3:
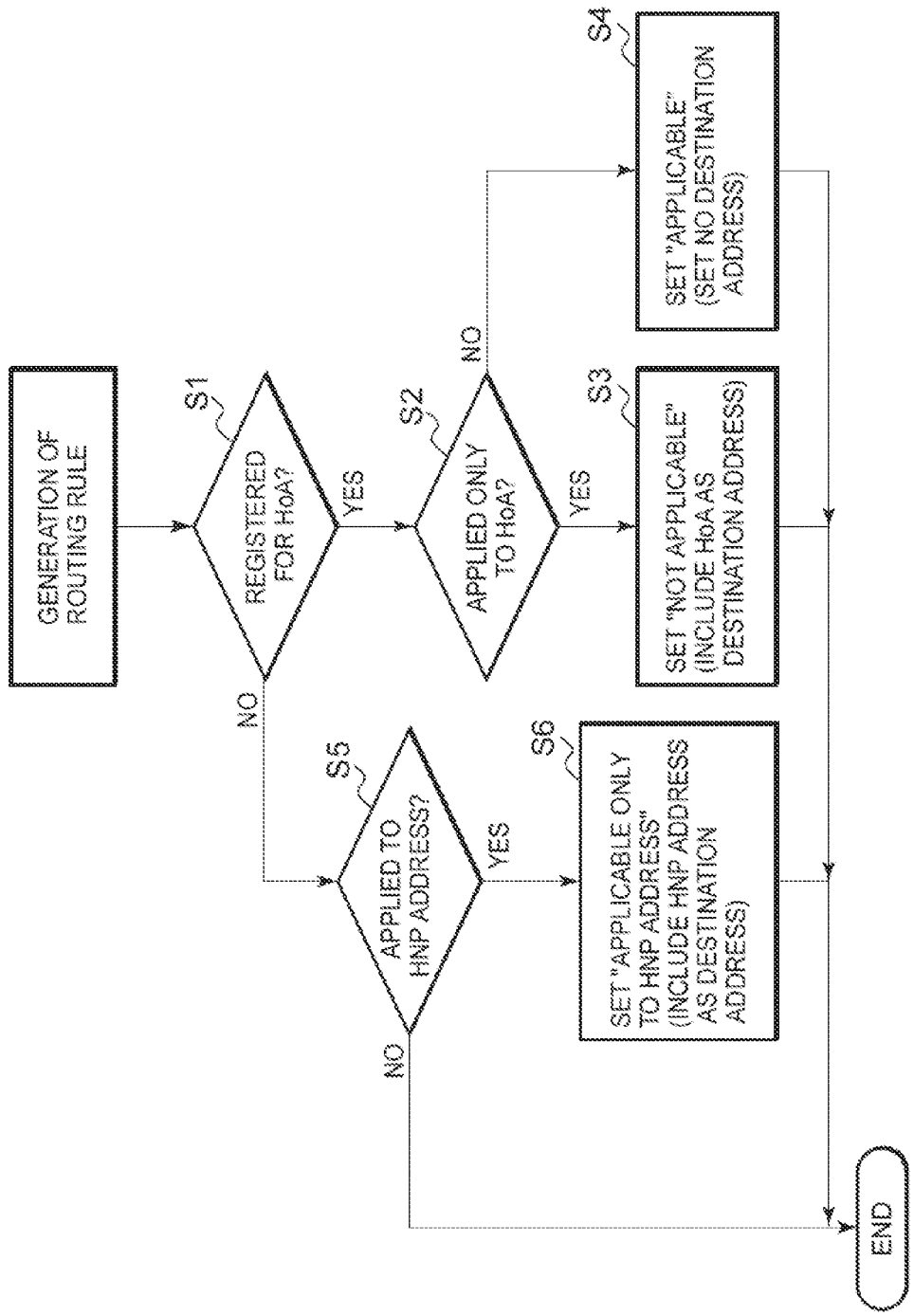
[FIG. 3] It is a flowchart for describing processing performed by a routing rule generating unit of FIG. 2.

Further, as shown in FIG. 3, the routing rule generating unit 101 determines whether the generated routing rule is to be applied to the HoA. If it is a rule to be registered for the HoA (YES in step S1) and the rule is applied only to the HoA (YES in step S2), information denoting "Not Applicable" is set as the applicability information (step S3). On the other hand, if it is a rule to be registered for the HoA (YES in step S1) but the rule is also applied to the HNP address (NO in step S2), information denoting "Applicable" is set (step S4). Further, a routing rule not to be registered for the HoA (NO in step S1) and is applied only to the HNP address can be defined and registered (YES in step S5). In this case, information denoting "Applicable Only to HNP Address" is set in the routing rule (step S6).

The applicability is determined based on the content of the routing rule. If the flow identified through the routing filter is a flow to be selected by the forwarding destination according to the defined routing rule regardless of the used address of the UE 10, "Applicable" will be determined. On the other hand, if the flow identified through the routing filter is a flow to which a different routing rule is to be applied depending on the used address of the UE 10, "Not Applicable" will be determined.

<Routing Rule Registration Message>

Figure 4:
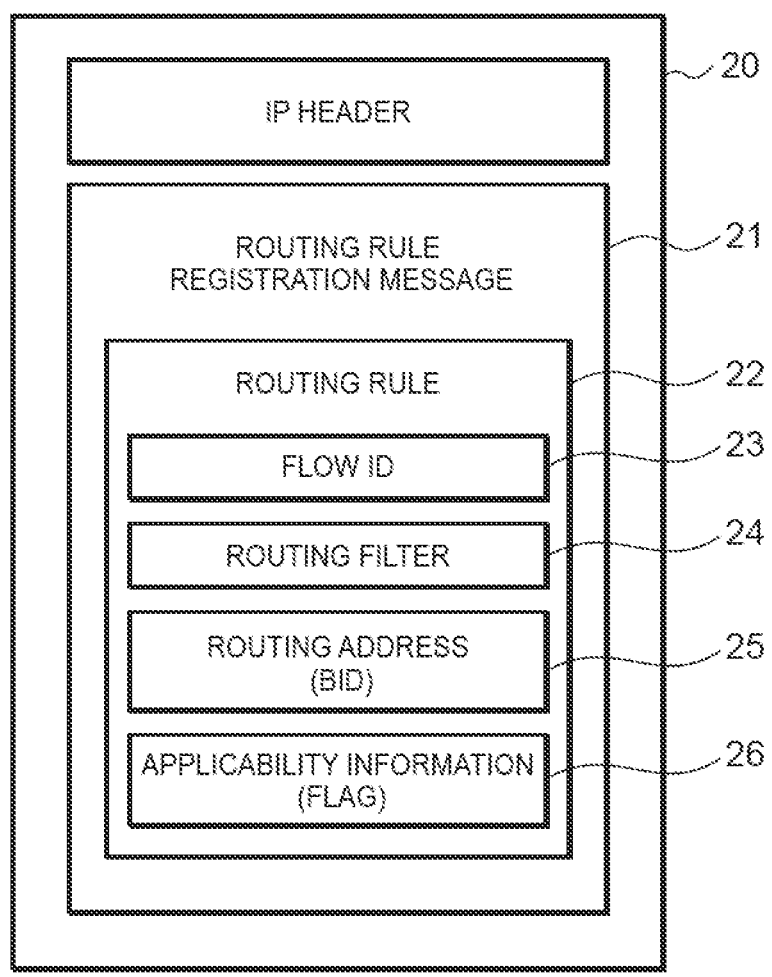
[FIG. 4] It is an explanatory drawing showing a format example of a routing rule registration message sent from the user equipment (UE) of FIG. 1.

FIG. 4 shows a format example of a packet 20 including the routing rule registration message 21. As mentioned above, the message 21 includes a flow ID 23 as a routing rule 22, a routing filter 24, a routing address (BID) 25, and applicability information 26. A flag in the routing rule registration message 21 can be used as the applicability information 26. For example, when this flag is set, it indicates "Applicable," while when the flag is not set, it indicates "Not Applicable."

Figure 5:
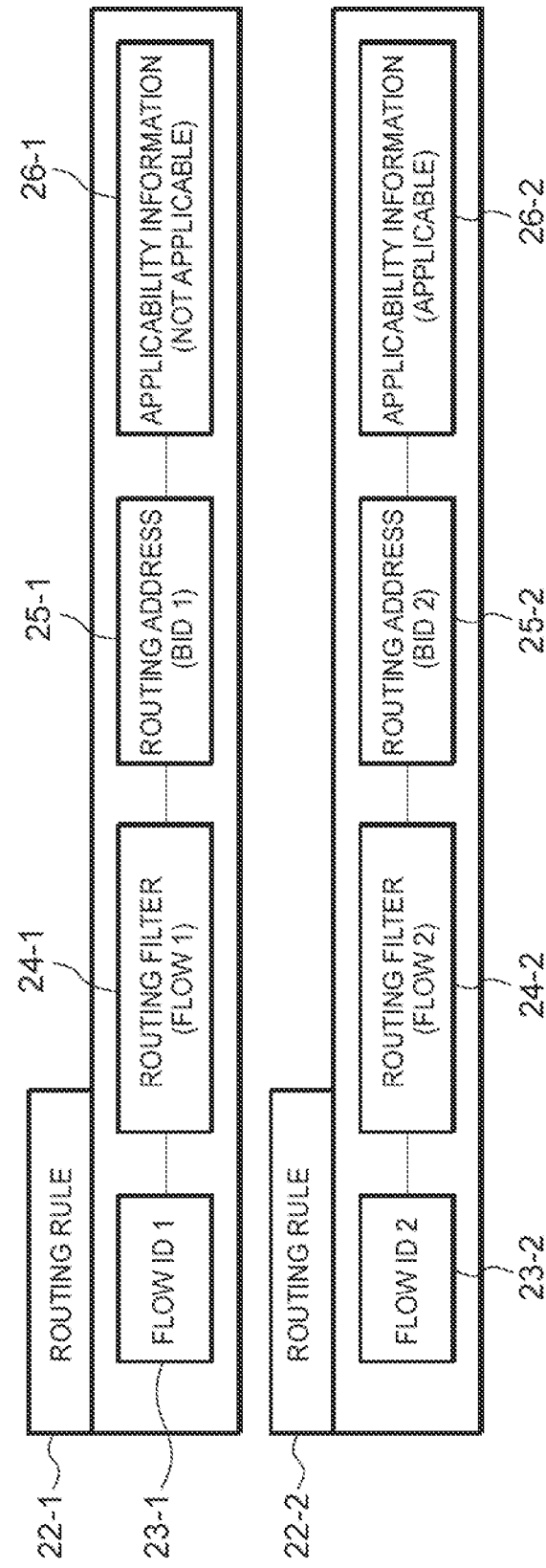
[FIG. 5] It is an explanatory drawing showing a routing rule sent through the routing rule registration message of FIG. 4.

FIG. 5 shows routing rules 22-1 and 22-2 for respective flows 1 and 2, which the UE 10 is to register with the P-GW 13 when the flag is used as the applicability information. The routing rule 22-1 for flow 1 is composed of flow ID 23-1 as flow ID 1, a routing filter 24-1 for flow 1, a routing address 25-1 as the BID 1, and applicability information 26-1 denoting "Not Applicable." The routing rule 22-2 for flow 2 is composed of flow ID 23-2 as flow ID 2, a routing filter 24-2 for flow 2, a routing address 25-2 as the BID 2, and applicability information 26-2 denoting "Applicable."

Figure 6:
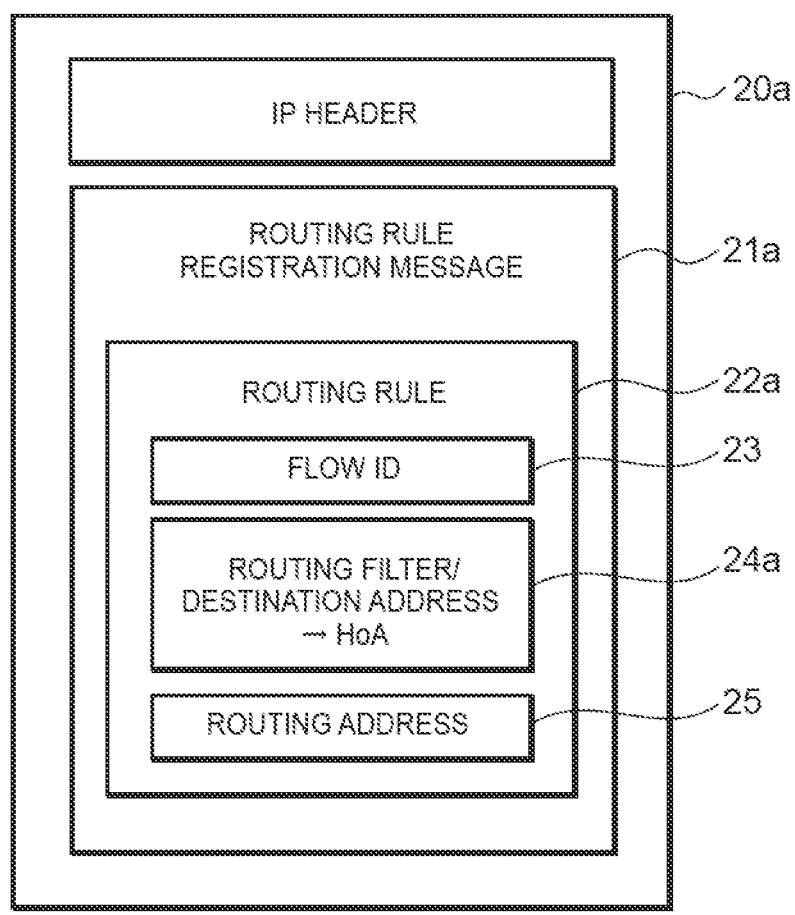
[FIG. 6] It is an explanatory drawing showing another format example of the routing rule registration message sent from the user equipment (UE) of FIG. 1.

In addition, as an alternative embodiment, another method of indicating the applicability information like a routing rule registration message 21*a* and its packet 20*a* as shown in FIG. 6 may be such that it is determined whether the HoA is specified as the destination address (destination address of packets received from the CN 17) as a constructional element in a routing filter 24*a* to determine whether the routing rule is a routing rule 22*a* applicable to the HNP address. In other words, when setting the HoA in the routing filter 24*a* as the destination address, the UE 10 gives notice of the fact that the routing rule is to be registered for the HoA only and not to be applied to the HNP address. On the other hand, when not setting the HoA in the routing filter 24*a* as the destination address, the UE 10 gives notice of the fact that the routing rule is applicable to not only the HoA but also the HNP address.

In the description of the routing filter here, packets received from the CN 17 are assumed. If the routing filter is defined for packets sent from the UE 10, applicability information is depending on whether the source address is specified or not. In other words, the source address in the routing filter corresponds to the destination address of packets sent from the CN 17. Further, as another alternative embodiment, the BID value may be used to indicate whether the routing rule is applicable to the HNP address. For example, when the BID is 16 bits in binary, a value indicating that the routing rule is dedicated to the HoA (Not Applicable) may be set as a value of higher-order 8 bits or lower-order 8 bits. Further, when the higher-order bits and the lower-order bits are separated and the higher-order bits are specified, applicable may be indicated, while when the lower-order bits are further specified, not applicable may be indicated. On the other hand, the higher-order bits may be handled as indicating not applicable and the lower-order bits may be handled as indicating applicable.

Figure 7:
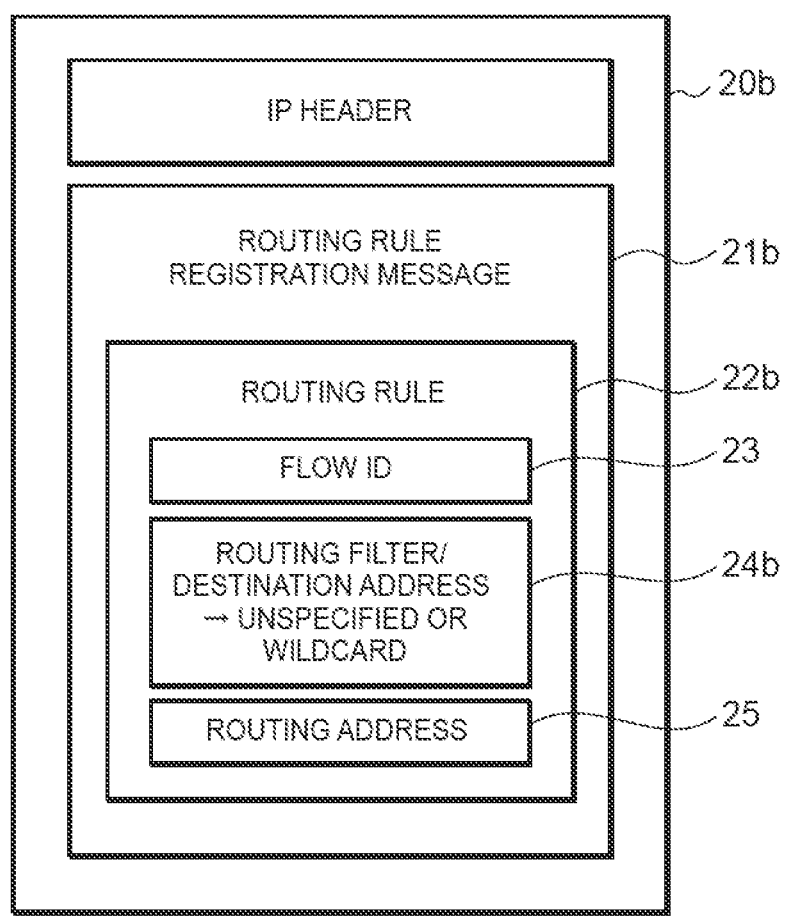
[FIG. 7] It is an explanatory drawing showing still another format example of the routing rule registration message sent from the user equipment (UE) of FIG. 1.

Like a routing rule registration message 21*b* and its packet 20*b* as shown in FIG. 7, no address may be specified in a routing filter 24*b* as information indicating that no HoA (specific address) is set, or a wildcard may be specified. Further, suppose that a routing rule is to be applied only to the HNP address is notified without registering any routing rule for the HoA. In this case, when the HNP address to be used is already decided, the HNP address is set as the destination address in the routing filter 24*b*. On the other hand, when any HNP address to be used is not decided yet, only the home prefix is set instead of the address. Note that a specific value indicative of being applicable to the HNP address may also be used instead of the home prefix.

FIG. 8 shows routing rules 22-1' and 22-2' for respective flows 1 and 2, which the UE 10 is to register with the P-GW 13 when the presence or absence of specification of a destination address as applicability information on the HNP address is used. The routing rule 22-1' for flow 1 is composed of flow ID 23-1 as flow ID 1, a routing filter 24*a* for flow 1, and a routing address 25-1 as the BID 1. Specifically, the routing filter 24*a* for flow 1 is composed of destination address→HoA, source address→CN, destination port number→777, source port number→666, and protocol number→30. The routing rule 22-2' for flow 2 is composed of flow ID 23-2 as flow ID 2, a routing filter 24*b* for flow 2, and a routing address 25-2 as the BID 2. Specifically, the routing filter 24*b* for flow 2 is composed of destination address→unspecified (wildcard), source address→CN, destination port number→999, source port number→888, and protocol number→40.

One registration message 20, 20*a*, or 20*b* can include multiple routing rules 22, 22*a*, 22*b*. The routing rules 22, 22*a*, 22*b* may be sent by including them in a BU message, or dedicated messages may be used. Further, they may be notified by including them in a message sent during the attach procedure performed upon attachment to the Non-3GPP network 14. In this case, it is desired to be notified by including them in PCO (Protocol Configuration Option).

<P-GW>

Figure 9:
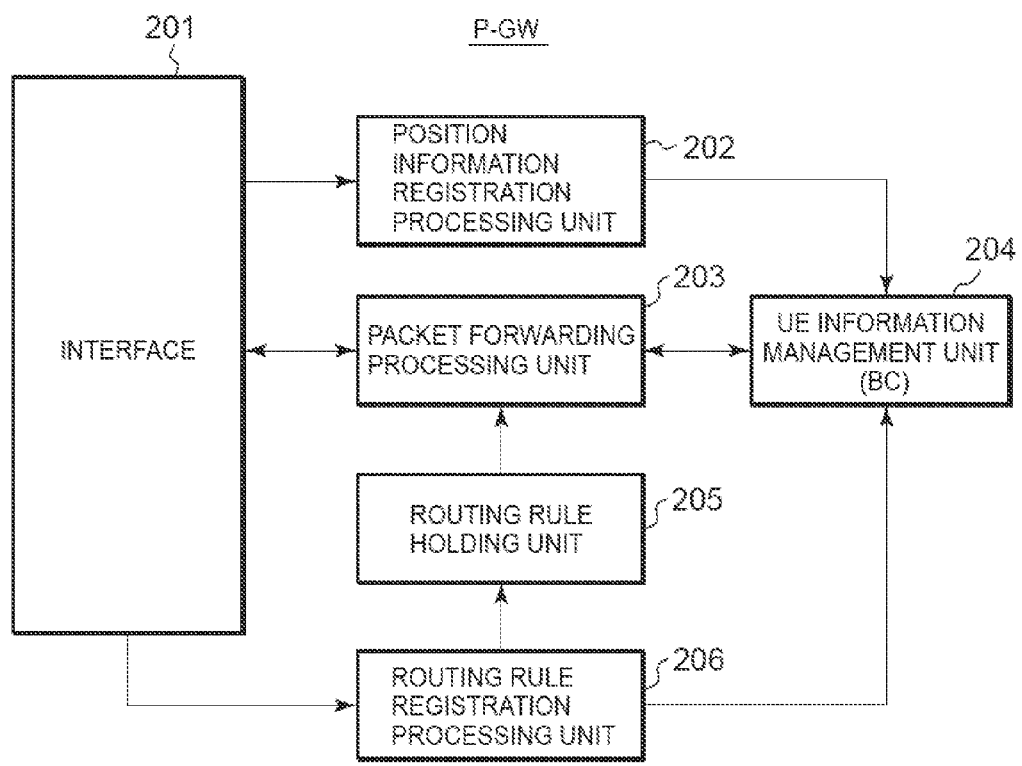
[FIG. 9] It is a block diagram showing a P-GW of FIG. 1 in detail.

FIG. 9 shows a block diagram of the P-GW 13. The P-GW 13 is made up of an interface 201, a position information registration processing unit 202, a packet forwarding processing unit 203, a UE information management unit (BC) 204, a routing rule holding unit 205, and a routing rule registration processing unit 206. The position information registration processing unit 202 processes a BU message received from the UE 10 to acquire the HoA and the CoA of the UE 10 included in the BU message and instructs the UE information management unit 204 to hold them as BCs.

<BC>

FIG. 10 shows a BC (HoA) for the HoA to be registered in the UE information management unit 204 of the P-GW 13 when the UE 10 shuts the door on whether any routing rule is applied to the HNP address. In the UE information management unit 204, BC 1 in which the HoA and the BID 1 are bound to the HoA and BC 2 in which the CoA and the BID 2 are bound to the HoA are registered.

Figure 11:
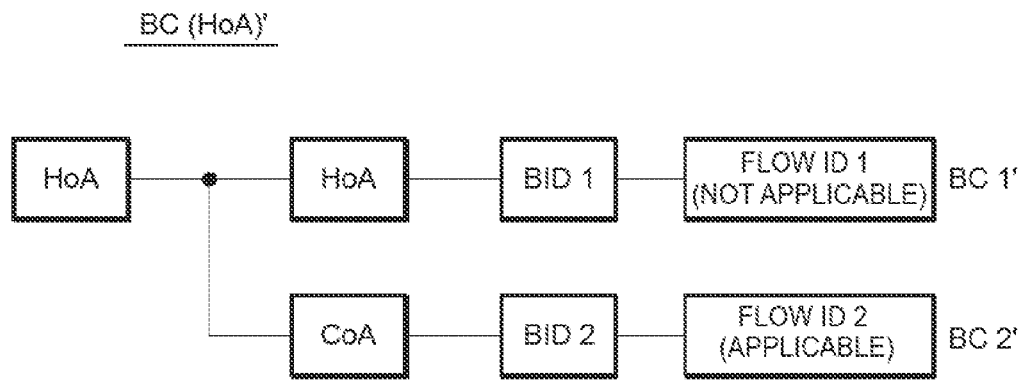
[FIG. 11] It is an explanatory drawing showing another example of the binding cache (BC) for the home address (HoA) registered in the UE information management unit of FIG. 9.

FIG. 11 shows a BC (HoA)' for the HoA to be registered in the UE information management unit 204 of the P-GW 13 when the UE 10 takes into account whether any routing rule is applied to the HNP address, where BC 1' in which the HoA, BID 1, and flow ID 1 are bound to the HoA and BC 2' in which the CoA, BID 2, and flow ID 2 are bound to the HoA are registered. Applicability information is added to each flow information. Here, not applicable is set in a routing rule indicated by flow ID 1, and applicable is set in a routing rule indicated by flow ID 2.

Figure 12:
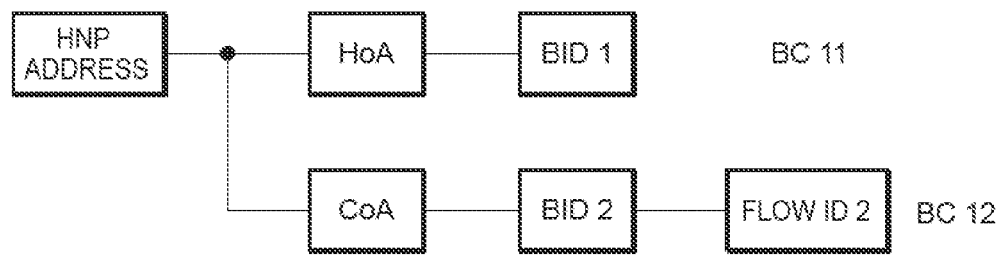
[FIG. 12] It is an explanatory drawing showing an example of a binding cache (BC) for a HNP address registered in the UE information management unit of FIG. 9.

FIG. 12 shows a BC (HNP address) for the HNP address to be registered in the UE information management unit 204 of the P-GW 13 by the UE 10 applying a routing rule, where BC 11 in which the HoA and BID 1 are bound to the HNP address and BC 12 in which the CoA, BID 2, and flow ID 2 are bound to the HNP address are registered. For example, when a flow indicated by flow ID 1 registered for the HoA is delivered to the HNP address, the routing rule for flow ID 1 is not applied to this flow. Therefore, if the forwarding destination specified by default is BID 2, the flow is forwarded to the CoA. In other words, as shown in FIG. 11, when the flow indicated by flow ID 1 is delivered to the HoA, since the routing rule for flow ID 1 is applied, the flow is forwarded to the HoA as the forwarding destination address corresponding to BID 1. On the other hand, in the case of a flow destined to the HNP address, the flow is forwarded to the CoA even if the flow is of the same type. Thus, since applicability information is added, the forwarding destination of a flow destined to the HNP address can be specified as the CoA, rather than the HoA, at the instant when the HNP address is used.

As another example, suppose that routing rule 1 indicating that flow 1 of packets destined to the HoA is forwarded to the WLAN interface IF2 and routing rule 2 indicating that flow 2 of packets destined to the HoA is also forwarded to the WLAN interface IF2 are registered with the P-GW 13, where not applicable is set for a routing rule indicated by flow ID 1 and applicable is set for a routing rule indicated by flow ID 2. In this case, when a flow indicated by flow ID 1 registered for the HoA is delivered to the HNP address, the routing rule for flow ID 1 is not applied to this flow. Therefore, if the forwarding destination specified by default is BID 1, the flow is forwarded to the HoA. In other words, when both flows indicated by flow ID 1 and flow ID 2 are delivered to the HoA, since both the routing rules for flow ID 1 and flow ID 2 are applied, both flows are forwarded to the CoA as the forwarding destination address corresponding to BID 2. On the other hand, in the case of flows destined to the HNP address, even if they are of the same type as that of the flows destined to the HoA, a flow indicated by flow ID 1 is forwarded to the HoA while a flow indicated by flow ID 2 is forwarded to the CoA.

<Packet Forwarding Processing>

When receiving a packet destined to the HoA of the UE 10 by proxy, the packet forwarding processing unit 203 refers to the routing rule holding unit 205 to search whether any routing filter 24, 24a, or 24b corresponding to the received packet exists. If any matched routing filter 24, 24a, or 24b exists, a BID corresponding to the routing filter 24, 24a, or 24b is acquired. Then, it makes an inquiry to the UE information management unit 204 about a forwarding destination address of a BC corresponding to the BID acquired. When the forwarding destination address acquired from the UE information management unit 204 is a CoA, a header with the CoA set as the destination address is added to (encapsulated in) a packet, and the packet is forwarded. On the other hand, when the forwarding destination address acquired from the UE information management unit 204 is the HoA, a packet is forwarded without encapsulation. The forwarding processing here is forwarding processing by the mobile IP, and as a matter of fact, forwarding processing by PMIP is also performed.

If no matched routing filter 24, 24a, or 24b exists, the packet forwarding processing unit 203 makes an inquiry to the UE information management unit 204 about a forwarding destination address of a BC specified by default, and performs forwarding to the address acquired. Further, the packet forwarding processing unit 203 performs forwarding processing on a packet received from the UE 10 and destined to the CN 17. Then, the source address of the packet (inner packet after de-encapsulated if encapsulated) received from the UE 10 is checked to check whether it is the HoA or the HNP address registered in the UE information management unit 204.

When the address is a HNP address, rather than the HoA, and the HNP address is not registered in the UE information management unit 204, the packet forwarding processing unit 203 refers to the routing rule holding unit 205 to acquire flow ID 23 for routing rule 22, 22a, or 22b in which the applicability information is set as applicable is acquired. Then, the packet forwarding processing unit 203 instructs the UE information management unit 204 to generate a BC including the HNP address in order to indicate that the HNP address is an address for which routing is permitted. At this time, the packet forwarding processing unit 203 also gives instructions to hold, in BC 11 and BC 12 of the HNP address, the forwarding destination address information already registered for the HoA. Further, among flow IDs registered in BC 1' and BC 2' for the HoA, the packet forwarding processing unit 203 gives instructions to apply only flow ID 23 of the previously acquired routing rule 22, 22a, or 22b applicable to the HNP address to BC 11 and BC 12 of the HNP address. On the other hand, when the HNP address is registered in the UE information management unit 204, its inner packet is forwarded to the CN 17. Note that information generated for the HNP address is not necessarily be an individual BC for the HNP address, and may be information indicative of equivalent meanings. For example, the HNP address may be included in a BC for the HoA as an address for which routing is permitted. Further, a list of addresses for which routing is permitted may be held. In this case, when receiving a packet destined to the HNP address, the packet forwarding processing unit 203 checks the filtering rules registered for the HoA so that only a routing rule in which the applicability information is set as applicable is considered upon forwarding the packet destined to the HNP address.

Further, a lifetime is set by the P-GW 13 for the HNP address. When the period of validity indicated by the lifetime has expired, BC 11 and BC 12 for the HNP address are deleted, and the HNP address is handled as nonforwardable from then on. When the UE 10 or the CN 17 receives any packet using a HNP address, if the HNP address is already registered in the UE information management unit 204, the lifetime of BC 11 and BC 12 is updated.

Further, the packet forwarding processing unit 203 checks for the destination address of the received packet destined to the UE 10. If the address is not the HoA, it refers to the UE information management unit 204 to check whether routing is permitted for the HNP address. If the address is a HNP address for which forwarding is permitted, the same processing as the above processing for the packet destined to the HoA is performed. A routing rule to be applied upon forwarding the packet destined to the HNP address is the routing rule applied to the BC for the HNP address generated when the packet destined to the CN 17 and the HNP address as the source address is received from the UE 10 as mentioned above. On the other hand, if the address is an unpermitted HNP address, the packet is discarded without being forwarded. In other words, since the HNP address used for the packet received from the UE 10 is registered as an address for which forwarding is permitted, the P-GW 13 starts forwarding the packet received from the CN and destined to the registered HNP address immediately after receiving, from the UE, the packet for which the HNP address is used. This can prevent forwarding of packets destined to a HNP address which the UE 10 is not using.

The UE information management unit 204 has a function as a BC for mobile IP to hold information on the HoA and CoA of the UE 10 passed from the position information registration processing unit 202. When a HNP address and an applicable flow ID are notified from the packet forwarding processing unit 203, a BC including the HNP address and forwarding destination address information registered in BC 1' and BC 2' for the HoA is generated. Further, among the flow IDs registered in BC 1' and BC 2' for the HoA in the BC, only the flow ID 23 in the applicable routing rule 22, 22a, or 22b applicable to the HNP address passed from the packet forwarding processing unit 203 is set in BC 11 and BC 12 for the HNP address. Even if the flow ID notified as a flow ID applicable to the HNP address is not registered in BC 1' or BC 2' for the HoA, it may be set in BC 11 or BC 12 for the HNP address. In this way, the routing rule 22, 22a, or 22b for the HNP address can be registered regardless of whether it is registered for the HoA or not.

The routing rule registration processing unit 206 processes the routing rule registration message 21, 21a, or 21b received from the UE 10 and instructs the routing rule holding unit 205 to acquire and hold the routing rule 22, 22a, or 22b included in the message 21, 21a, or 21b. The routing rule holding unit 205 holds the routing rule 22, 22a, or 22b passed from the routing rule registration processing unit 206.

Figure 13:
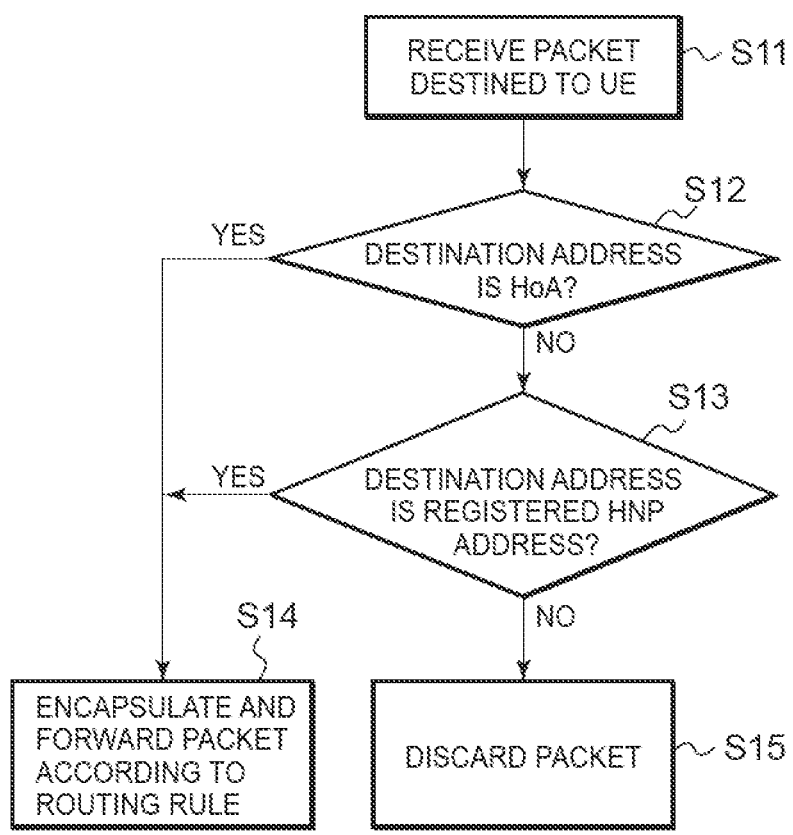
[FIG. 13] It is a flowchart for describing downlink processing performed by a packet forwarding processing unit of FIG. 9.

FIG. 13 is a flowchart for describing downlink processing performed by the packet forwarding processing unit 203 of the P-GW 13. First, when a packet destined to the UE 10 is received (step S11), it is checked whether the destination address of the packet is the HoA (step S12). If the destination address is the HoA (YES in step S12), the packet is encapsulated and forwarded according to a routing rule for the flow (step S14). If the destination address is not the HoA (NO in step S12), it is checked whether the destination address of the packet is a registered HNP address (step S13). If it is the registered HNP address (YES in step S13), the packet is encapsulated and forwarded according to a routing rule for the flow (step S14), while if it is not the registered HNP address (NO in step S13), the packet is discarded (step S15).

Figure 14:
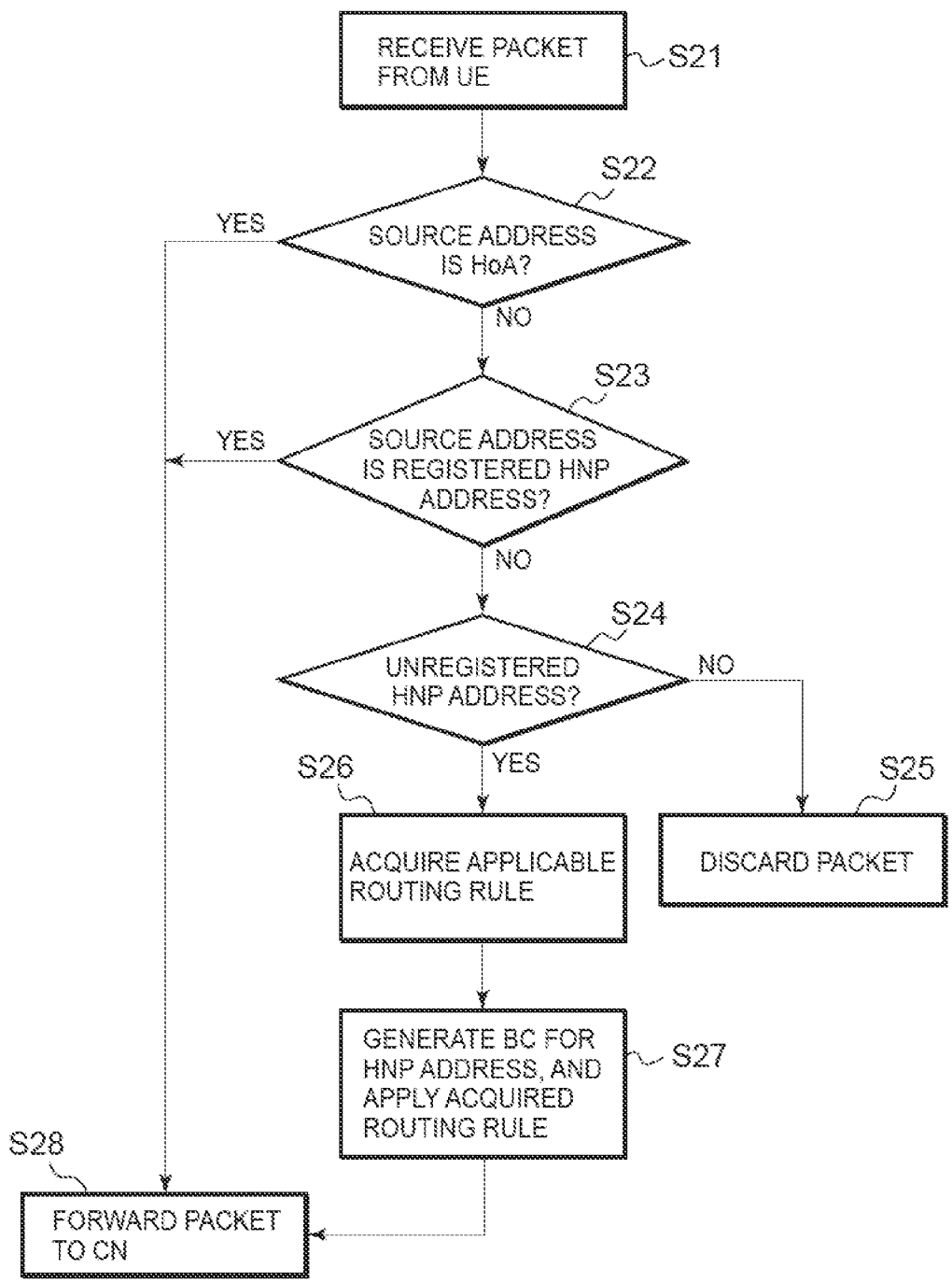
[FIG. 14] It is a flowchart for describing uplink processing performed by the packet forwarding processing unit of FIG. 9.

FIG. 14 is a flowchart for describing uplink processing performed by the packet forwarding processing unit 203. First, when a packet is received from the UE 10 (step S21), it is checked whether the source address of the packet is the HoA (step S22). If the source address is the HoA (YES in step 22), the packet is forwarded to the CN 17 (step S28). If the source address is not the HoA (NO in step S22), it is checked whether the source address of the packet is a registered HNP address (step S23). If it is a registered HNP address (YES in step S23), the packet is forwarded to the CN 17 (step S28). If the source address is not any registered HNP address (NO in step S23), it is checked whether the source address is an unregistered HNP address (step S24). If it is not the unregistered HNP address (NO in step S24), the packet is discarded (step S25). Here, the case where the source address is not the unregistered HNP address means such a case that the source address is not an address generated from a HNP. On the other hand, if the source address is the unregistered HNP address (YES in step S24), an applicable routing rule is acquired (step S26), and BC 11 and BC 12 for the HNP address are generated, the acquired routing rule is applied (step S27), and the packet is forwarded to the CN 17 (step S28).

As described above, according to the first embodiment of the present invention, since the P-GW 13 permits packet forwarding to the UE 10 only for the HNP address used by the UE 10, forwarding of packets destined to HNP addresses unused by the UE 10 can be prevented, so that an increase in the load on the UE 10 to manage addresses can be prevented. Forwarding of packets delivered to HNP addresses unintended by the UE 10 can also be prevented. Further, not only can the setting of any routing rule invalid for the HNP address be prevented, but also the UE 10 does not need to send a routing rule registration message for setting a routing rule for the HNP address, so that the amount of traffic and message exchange processing between the UE and the P-GW 13 can be reduced.

Second Embodiment

In a second embodiment of the present invention, it will be described how to handle a HNP address in TFT (Traffic Flow Template) defined for selecting a bearer on the 3GPP interface IF1. The TFT is information used for determining to which EPS bearer packets destined to the UE 10 are to be mapped (Bearer Binding) when there are two or more EPS bearers (Evolved Packet System bearers) between the UE 10 accessing the 3GPP network 11 and the P-GW 13, or between the UE 10 and the S-GW 12. When the connection to the 3GPP network 11 is established using GTP (GPRS tunneling protocol), the P-GW 13 performs bearer binding, while when it is established using PMIP, the S-GW 12 performs bearer binding.

The TFT includes a packet filter (also called a routing rule or a filtering rule), and each TFT is associated with any of EPS bearers. Like in the first embodiment, when the UE 10 starts using a new HNP address, applicability information indicating whether the already defined TFT is applied to the HNP address is set in the TFT. The applicability information is set by PCRF (Policy Control and Charging Rules Function) or by the UE 10. After the UE 10 starts using the HNP address and the HNP address is registered in the UE information management unit 204 as a forwardable address, when a packet destined to the HNP address is received from the CN 17, bearer binding is performed using a TFT to which applicable information is added. If no applicable TFT exists, the packet will be forwarded by using a default bearer or a bearer with which none of the TFTs are associated.

As a method of indicating whether a TFT is applicable or not, a flag or the like in a message upon registering the TFT with the P-GW 13 or the S-GW 12 can be used like in the first embodiment. For example, when the flag is set, it indicates that the TFT is also applicable to the HNP address, while when the flag is not set, it indicates that the TFT is not applicable to the HNP address. Further, as another method of indicating the applicability information, it may be indicated whether the routing rule 22, 22a, or 22b is applicable to the HNP address based on whether the HoA is included as a destination address (destination address of packets received from the CN) in the routing filter 24, 24a, or 24b. Note that the same method as that described in the first embodiment can be used for the applicable information. Note also that packets destined to HNP addresses that are not registered as forwardable addresses can be discarded.

As described above, the second embodiment of the present invention can not only prevent use of a TFT invalid for the HNP address and hence selection of an inappropriate EPS bearer, but also reduce the amount of traffic and processing for message exchange among the UE 10, the PCTF, the P-GW 13, and the S-GW 12, because the UE 10 or the PCTF on the network side does not need to send a message for setting a TFT for the HNP address.

Third Embodiment

In a third embodiment, description will be made of a case where the UE 10 is connected to a macro base station (evolved Node B (eNB), Node B, or macro cell) or a femto base station (which is also called a home evolved Node B (Home eNB, abbreviated as HeNB below), a home Node B (Home NB), a home base station or small-size base station, a proxy base station, a CSG (Closed Subscriber Group) cell) in the 3GPP, constructing a path to a 3GPP core network (home network) through the macro base station or the HeNB and to a foreign network (such as the Internet) via the 3GPP core network, and a path direct to the foreign network (such as the Internet) through the macro base station or the HeNB. Although the following will describe the case of the HeNB, the same holds true for the case where the path direct to the foreign network through the macro base station is constructed.

The HeNB is a small-size home base station having a smaller wireless coverage than the macro base station. The UE connected to the HeNB can use not only access to the 3GPP core network via the HeNB (hereinafter, path via 3G), but also access (LIPA: Local IP Access) to a local network under the control of the HeNB or direct access to the Internet without taking the route via the 3GPP core network (SIPTO: Selected IP Traffic Offload, which is referred to as "direct path" below). In this case, when the UE connected to a macro base station usually uses the path via 3G upon access to the Internet. On the other hand, when the UE is connected to the HeNB, the direct path without taking the route via the 3GPP core network is selected, so that a flow sent from the UE can be forwarded directly to the Internet through the HeNB. The advantage of using the direct path is that the load on the 3GPP core network can be reduced. Further, when the UE communicates with a node on the Internet, since there is no need to take the route via the 3GPP core network, the load on the 3GPP core network can be suppressed and the communication can be performed along the shortest path.

<Network>

Figure 15:
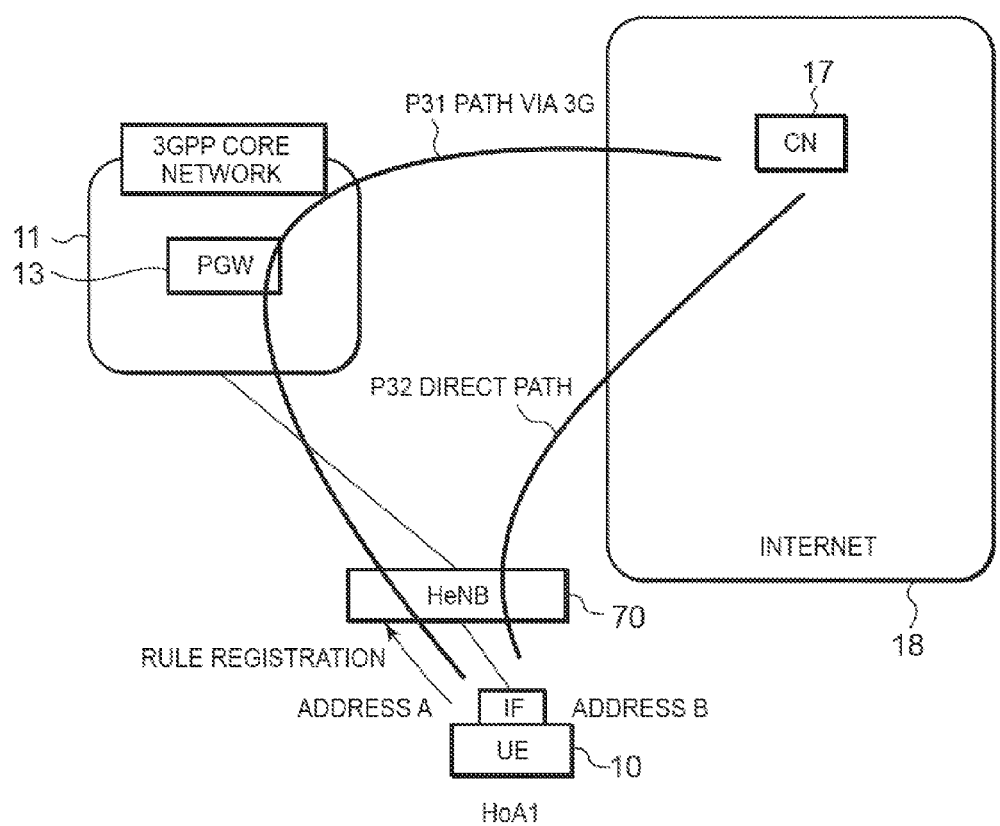
[FIG. 15] It is an explanatory drawing showing a network configuration of a third embodiment.

FIG. 15 is a diagram showing a network configuration when a UE 10 having one 3GPP interface IF connects to a HeNB 70 as the home base station of the UE 10 to communicate with a CN 17, for example, on the Internet 18 selectively via a path via 3G P31 or a direct path P32. Usually, when connecting to the macro base station, the UE 10 communicates with a node in a foreign network through the path via 3G using an address generated from a prefix assigned. In contrast, the UE 10 of the embodiment acquires two addresses, address A for the path via 3G P31 and address B for the direct path P32 to connect to the HeNB 70. It is desired that a prefix for generating address A be different from a prefix for generating address B, but if the HeNB 70 can translates addresses, different addresses A and B may be generated from a common prefix. Further, if the HeNB 70 can translate addresses, address A for the path via 3G P31 and address B for the direct path P32 may be the same. The following will describe a case where different addresses A and B are used.

Depending on the path used (path via 3G P31 or direct path P32), the UE 10 selects an address (address A or address B) to be set as the source address of packets to be sent. When receiving packets sent from the UE 10, the HeNB 70 forwards only the packets for which address A or B corresponding to the forwarding destination path P31 or P32 is set as the source address. Therefore, in order to prevent the sent packets from being discarded by the HeNB 70, address A as an address valid on the path via 3G P31 is selected when the path via 3G P31 is used, while address B as an address valid on the direct path P32 is selected when the direct path P32 is used. When the UE 10 selects the forwarding destination path P31 or P32 for packets sent from itself, if a routing rule is registered, the UE 10 will need to follow the routing rule. This is because flows that do not meet the routing rule are basically discarded by the HeNB 70. Like in the first embodiment, the routing rule includes flow identification information (routing filter) and forwarding destination information (routing address). The flow identification information is information for identifying a flow, such as the type of medium (audio, video, etc.) or 5-Tuple (source/destination IP Addresses, source/destination Port Numbers, and Protocol number), and the forwarding destination information is information indicative of the flow forwarding destination path P31 or P32 corresponding to the flow identification information. As for the forwarding destination information, for example, in the case of the network configuration in FIG. 15, the access technology type such as "3GPP" or "WLAN," or an address corresponding to the forwarding destination path such as "address A" or "address B" can be specified as the information indicative of each of the paths P31 and P32.

When sending a packet, the UE 10 compares the flow identification information in the routing rule with the packet to be sent to check whether there is a matched routing rule. When there is a matched routing rule, it follows the rule to send the packet to the forwarding destination path P31 or P32 as described in the rule. The routing rule may be generated based on a policy acquired from an information server (ANDSF server, PCRF, policy server) in the 3GPP operator network, or based on a policy (preference) previously registered with the UE 10. Even if the routing rule is generated based on the policy previously registered with the UE 10, the rule may be generated in consideration of the policy acquired from the information server.

The same routing rule as that used by the UE 10 to select a forwarding destination is also registered with the HeNB 70. As a method of notifying the HeNB 70 of the rule, the UE 10 may directly notify the HeNB 70 of it, or the information server or an entity (PGW, GGSN, SGSN, SGW, or the like) in the core network may notify the HeNB 70 of it. The HeNB 70 uses the registered routing rule to check whether packets sent by the UE 10 are going to be sent to the correct forwarding destination path P31 or P32 described in the rule. In other words, when receiving packets sent from the UE 10, the HeNB 70 checks whether the packets are packets in which address A or B valid on the forwarding destination path P31 or P32 is set in the source address, and forwards only the packets matching with a flow specified in the flow identification information. For example, when there exists a rule, as a routing rule, with a content that the forwarding destination path for the flow identification information (flow represented by the type of medium or 5-tuple) indicating that "flow A whose flow type is Web data" is the "direct path" ("Type=Flow A=>Direct path," which is called "Rule 1" below), the UE 10 sets address B in the source address of a Web data packet according to Rule 1 and sends the packet. The HeNB 70 that received this packet finds Rule 1 having flow identification information that matches the received packet and confirms that address B is set in the source address, and forwards the packet to the direct path P32.

On the other hand, if the routing rule for forwarding the flow identification information that matches the packet received by the HeNB 70 from the UE 10 is not registered with the HeNB 70, the HeNB 70 cannot find the rule. Since this does not follow Rule 1 registered, the packet of flow A is discarded by the HeNB 70 without being forwarded to the direct path P32. In other words, when the type of flow is Web data and the source address is address A ($\neq$B), the flow matches the flow identification information of Rule 1, but since address A that does not correspond to the forwarding destination path P32 is set as the source address, the flow is discarded by the HeNB 70, except in cases where there exists a default rule with a content that "flows with address A set as the source are forwarded to the path via 3G P31."

According to this Rule 1, since packets of flow A sent from the UE 10 are forwarded to the direct path P32, address B valid on the direct path P32 needs to be set in the packet source address. If the HeNB 70 detects that the source address of a packet of flow A sent from the UE 10 is address A, the HeNB 70 will not forward the packet to the path via 3G P31. Thus, since packets of flow A sent from address A are discarded by the HeNB 70, packet loss occurs. Further, in the case of following this Rule 1, since all packets of flow A has to be forwarded using the direct path P32, the UE 10 cannot forward flow A along the path via 3G P31. In other words, even if a correspondent of the UE 10 exists under the control of the 3GPP core network 11, all packets of flow A will need to be forwarded to a foreign network through the direct path P32 to deliver the packets to the correspondent, causing a forwarding delay.

In order to prevent such packet loss or forwarding delay, the embodiment describes a method of enabling use of the path via 3G P31 when it is desired to send packets of flow A along the path via 3G P31 or when the transmission is approved even if a rule like Rule 1 is registered. When registering the rule with the HeNB 70, the UE 10 of the embodiment specifies information (rule-unapplied information) indicating that the rule is unapplied to any address newly acquired by the UE 10 after registration of the rule. When the rule-unapplied information is specified, the rule is applied only to the addresses held by the UE 10 at the time of registering the rule, and the rule is not applied to any other address that is not held by the UE 10 at the time of registering the rule. In other words, a new rule for making it possible to forward packets of flow A sent using a newly acquired address after registration of the rule can be registered.

On the other hand, when the rule-unapplied information is not specified upon registration of the rule with the HeNB 70, the rule is applied to an address that is not held by the UE 10 at the time of registering the rule (i.e., a newly acquired address after registering the rule) as well as the addresses held by the UE 10 at the time of registering the rule. In other words, when the rule-unapplied information is not specified, the rule is applied to all addresses including the address newly acquired by the UE 10. In this case, a new rule for forwarding flow A sent from the address newly acquired after registering the rule cannot be registered. For example, when the rule-unapplied information is specified for Rule 1, the HeNB 70 holds information on the addresses held by the UE 10 at the time of acquiring Rule 1 in association with Rule 1. If the rule is generally not applied to any address that is not held by the UE 10 at the time of registration, rule-applied information indicating that the rule is applied only to the addresses held by the UE 10 at the time of registering the rule may be used.

Here, description will be made of several cases according to connection modes of the UE 10.

<Case 1>

First, description will be made of a case (Case 1) where Rule 1 ("Type=Flow A (e.g., Web)=>direct path") is registered with the HeNB 70 when address B valid on the direct path P32 is acquired though the UE 10 has not yet established the path via 3G P31 in FIG. 15. If there is a possibility of sending flow A through the path via 3G P31 when registering Rule 1 with the HeNB 70, the UE 10 adds the rule-unapplied information to Rule 1. On the other hand, when forwarding flow A only via the direct path P32, the UE 10 registers Rule 1 without specifying the rule-unapplied information for Rule 1. Note that, when the UE 10 refers to a policy (a previously set policy or a policy acquired from the information server) upon generation of a routing rule, if information indicating whether the rule-unapplied information is specified for the rule to be registered is included in the policy, the UE 10 determines whether to specify the rule-unapplied information according to the specification. For example, if both WLAN and 3G are specified as the forwarding destinations of flow A in the policy with higher priority given to WLAN ("Type=Flow A (e.g., Web)=>1st Priority: Direct Path (WLAN), 2nd Priority: path via 3G (3G)"), the UE 10 determines that flow A could be sent using the path via 3G P31, and specifies the rule-unapplied information for the rule to be registered. On the other hand, if only WLAN is specified as a candidate for the forwarding destination of flow A, the UE 10 determines that flow A is not sent using the path via 3G P31, and hence does not specify the rule-unapplied information to the rule to be registered.

The HeNB 70 that accepted the registration of Rule 1 recognizes flow A as a flow forwardable to the direct path P32. Suppose here that the UE 10 newly establishes the path via 3G P31 and acquires address C valid on the path via 3G P31. At this time, when the rule-unapplied information is specified for Rule 1, Rule 1 is applied only to packets related to address B and not applied to packets of flow A sent from address C. Therefore, a rule, as a new rule for flow A, with a content that the forwarding destination path for a "flow whose type is flow A and source address is address C" is the "path via 3G" ("Type=Flow-A (Web), Source Address=Address-C=>Path via 3G," which is called "Rule 1-1" below) is registered with the HeNB 70, so that packets of flow A sent from address C can be forwarded to the path via 3G P31. On the other hand, when the rule-unapplied information is not specified in Rule 1, since Rule 1 is applied to packets of flow A sent from address C as well as packets related to address B, the packets of flow A sent from address C are not forwarded to the path via 3G P31. Therefore, address B needs to be used to forward flow A when Rule 1 is registered without specifying the rule-unapplied information. Note that if the rule-unapplied information is not specified in Rule 1, Rule 1-1 cannot be registered.

<Case 2>

Next, description will be made of a case (Case 2) where Rule 1 is registered with the HeNB 70 after the UE 10 establishes both the path via 3G P31 and the direct path P32 in FIG. 15 and acquires address A valid on the path via 3G P31 and address B valid on the direct path P32. In this Case 2, if there is a possibility of sending flow A through the path via 3G P31 when registering Rule 1 with the HeNB 70, the UE 10 also adds the rule-unapplied information to Rule 1. On the other hand, when forwarding flow A only via the direct path P32, the UE 10 registers Rule 1 without specifying the rule-unapplied information for Rule 1. Note that, when the UE 10 refers to a policy (a previously set policy or a policy acquired from the information server) upon generation of a routing rule, if information indicating whether the rule-unapplied information is specified for the rule to be registered is included in the policy, the UE 10 determines whether to specify the rule-unapplied information according to the specification.

When the rule-unapplied information is specified in Rule 1, the HeNB 70 applies Rule 1 only to address A and address B held by the UE 10 at the time of registration of Rule 1. In other words, forwardable is determined when the source address of packets related to flow A is address B, or address A when it is determined that forwarding is not permitted. In this case, the HeNB 70 forwards flow A sent from address B to the direct path P32 but does not forward flow A sent from address A. Further, since the rule-unapplied information is specified in Rule 1, Rule 1 is not applied to flow A sent from an address (address C) newly acquired as valid on the path via 3G P31 after the UE 10 registers Rule 1. Therefore, the UE 10 registers Rule 1-1 with the HeNB 70 as a new rule for flow A so that flow A sent from address C can be forwarded to the path via 3G P31.

On the other hand, when the rule-unapplied information is not specified in Rule 1, the HeNB 70 applies Rule 1 to all the addresses used by the UE 10. In this case, Rule 1 is applied not only to address A and address B, but also to address C, so that flow A sent from address C invalid on the direct path P32 as the forwarding destination in Rule 1 is not forwarded. Therefore, address B needs to be used to forward flow A when Rule 1 is registered without specifying the rule-unapplied information. Note that when the rule-unapplied information is not specified in Rule 1, the UE 10 cannot register Rule 1-1 with the HeNB 70.

<Case 3>

Next, description will be made of a case (Case 3) where a rule ("Type=Flow B (e.g., VoIP)=>Path via 3G," which is called Rule 3 below) is registered with the HeNB 70 after the UE 10 establishes the path via 3G P31 and acquires address A valid on the path via 3G P31 in FIG. 15. When registering Rule 3 with the HeNB 70, if the address used for sending flow B is limited to address A, the UE 10 adds the rule-unapplied information to Rule 3. On the other hand, if the address used for sending flow B to the path via 3G P31 is not limited, the UE 10 registers Rule 3 without specifying the rule-unapplied information. Note that when the UE 10 refers to a policy (a previously set policy or a policy acquired from the information server) upon generation of a routing rule, if information indicating whether the rule-unapplied information is specified for the rule to be registered is included in the policy, the UE 10 determines whether to specify the rule-unapplied information according to the specification. The HeNB 70 that accepts the registration of Rule 3 recognizes flow B as a flow forwardable to the path via 3G P31 based on Rule 3, i.e., as a flow whose packets are not discarded. It is assumed here that the UE 10 newly acquires address C as an address valid on the path via 3G P31.

When Rule 3 is registered by the UE 10, if Rule 3 is registered with the rule-unapplied information specified, Rule 3 is applied only to packets related to address A, and not applied to packets of flow B sent from address C. Since the packets of flow B sent from address C are received by the HeNB 70, and the source address is recognized not to be address A to which Rule 3 is applied, the packets are not forwarded to the path via 3G P31. Therefore, address A needs to be used to forward flow B to the path via 3G P31 when Rule 3 is registered with specifying the rule-unapplied information.

On the other hand, when Rule 3 is registered without specifying the rule-unapplied information, since Rule 3 is applied to the packets of flow B sent from address C as well as the packets related to address A, even the packets of flow B sent from address C as the source address, rather than address A, can be forwarded to the path via 3G P31. Note that the above Case 3 describes the case of using the path via 3G P31, it may also be a case of using the direct path P32.

When Rule 3 is registered with specifying the unapplied information, if a rule, as a new rule related to flow B, with a content that the forwarding destination path for a "flow whose type is flow B and source address is address C" is the "path via 3G" ("Type=Flow B (VoIP), Source Address=Address–C=>Path via 3G," which is called "Rule 3-1" below) is permitted to be registered with the HeNB 70, the UE 10 will register Rule 3-1 with the HeNB 70, so that the packets of flow B sent using address C can be forwarded to the path via 3G P31. Note that the determination on whether a rule like Rule 3-1 for forwarding the packets of flow B sent using address C to the path via 3G P31 can be registered may be made according to a policy acquired by the UE 10.

<UE>

Figure 16:
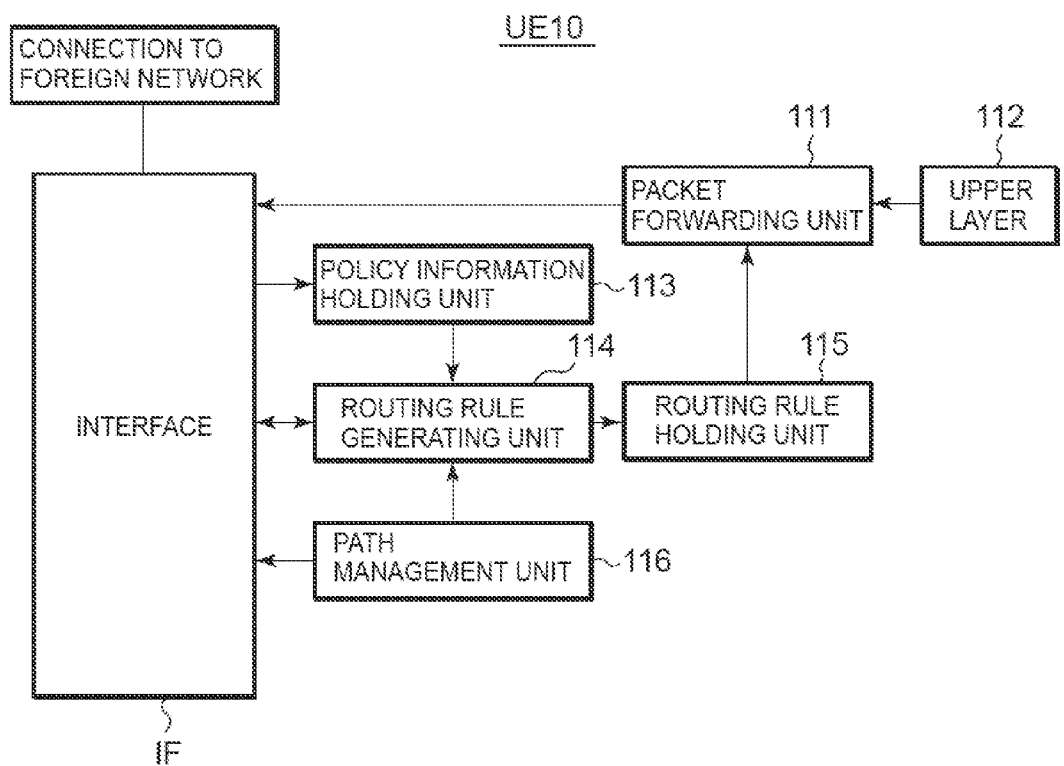
[FIG. 16] It is a block diagram showing user equipment (UE) of FIG. 15 in detail.

A configuration of the UE 10 of the embodiment will be described with reference to FIG. 16. The UE 10 shown in FIG. 16 has one interface IF corresponding to 3GPP, a packet forwarding unit 111, an upper layer 112, a policy information holding unit 113, a routing rule generating unit 114, a routing rule holding unit 115, and a path management unit 116. The policy information holding unit 113 acquires policy information to be referred to from a policy server, not shown, when generating a routing rule. For example, a basic policy in which the direct path P32 is specified as the forwarding destination path of flow A is specified or the like is acquired. The routing rule generating unit 114 generates and registers a routing rule based on the acquired policy information or a policy held by the UE 10 itself, and an actual communication state as well. The routing rule generating unit 114 also determines whether to specify the rule-unapplied information for the rule when registering the rule based on the basic policy.

Figure 17:
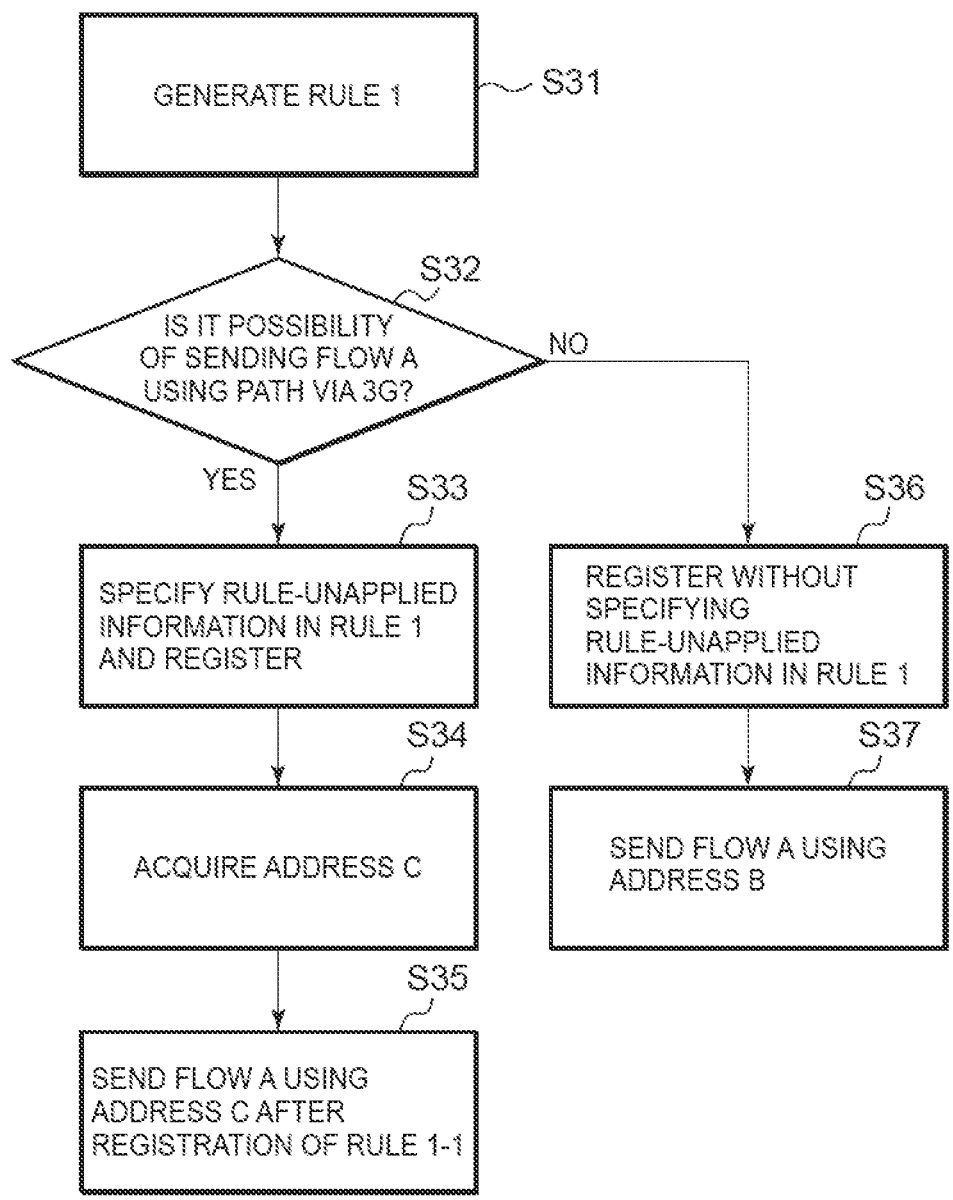
[FIG. 17] It is a flowchart for describing an example of processing performed by the UE of FIG. 15.

FIG. 17 is a flowchart showing processing performed by each unit of the UE 10 in Case 1 and Case 2 mentioned above. When generating Rule 1 in step S31, if flow A is determined to be a flow communicable using the path via 3G P31 or to be possible to communicate using the path via 3G P31 (YES in step S32), the routing rule generating unit 114 specifies the rule-unapplied information in Rule 1 (rule applied only to the address at the time of registration) and registers it with the UE 10 itself and the HeNB 70 (step S33). On the other hand, if No in step S32, a rule without specifying the rule-unapplied information in Rule 1 (rule applied to all the addresses of the UE 10) is registered with the UE 10 itself and the HeNB 70 (step S36).

For example, if both WLAN and 3G are specified as the forwarding destinations of flow A in a policy held by the policy information holding unit 113 with higher priority given to WLAN ("Type=Flow A (e.g., Web)=>1st Priority: Direct Path (WLAN), 2nd Priority: path via 3G (3G)"), the UE 10 determines that flow A could be a flow to be sent using the path via 3G P31 (YES in step S32). In this case, the UE 10 specifies the rule-unapplied information in the rule to be registered (step S33). On the other hand, if only WLAN is specified as a candidate for the forwarding destination of flow A, the UE 10 determines that flow A is not sent using the path via 3G P31 (NO in step S32), and hence does not specify the rule-unapplied information to the rule to be registered (step S36).

Following step S33, it is assumed that the path management unit 116 establishes a new PDN connection to acquire address C (step S34). After acquiring address C, if there is a need to send flow A along the path via 3G P31 from address C, Rule 1-1 is registered with the HeNB 70 so that packets of flow A can be sent using address C (step S35). On the other hand, since Rule 1 is applied only to address B after step S36, if the UE 10 sends flow A when Rule 1 is registered, address B needs using (step S37).

After the rule-unapplied information is specified in Rule 1, when the UE 10 establishes a new PDN connection and address C is assigned, since Rule 1 is not applied to address C as mentioned above, Rule 1-1 is newly registered, so that packets of flow A for which address C is set as the source address can be sent to the path via 3G P31. Note that the establishment of the new PDN connection for forwarding flow A to the path via 3G P31 may be made at the time when the need to forward flow A to the path via 3G P31 arises. In other words, step S34 and beyond may be omitted if the forwarding of flow A from address is not needed.

Figure 18:
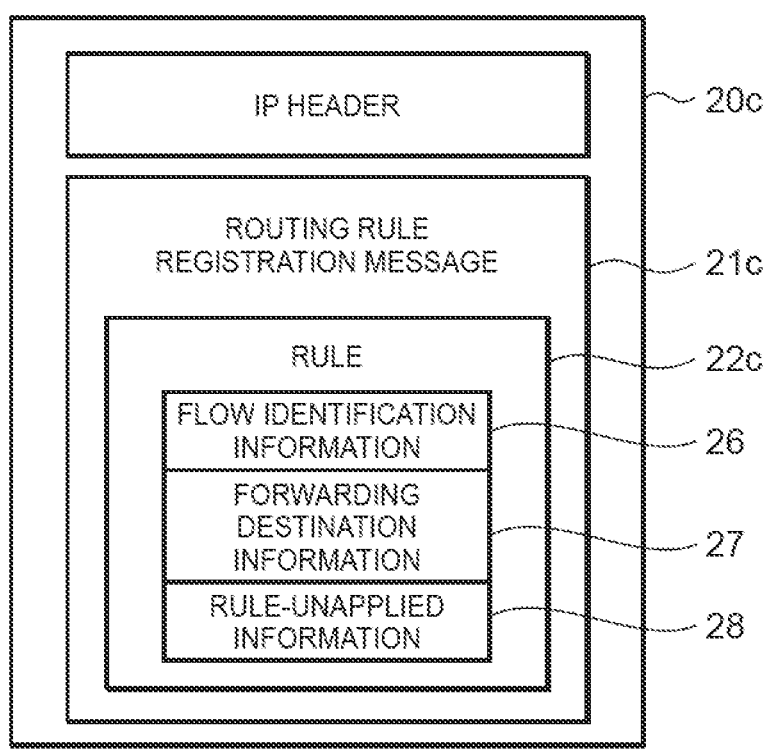
[FIG. 18] It is an explanatory drawing showing the format of a routing rule registration message in the third embodiment.

FIG. 18 shows the structure of a packet 20c in a routing rule registration message 21c to be sent by the UE 10 to register Rule 1 with the HeNB 70. The message 21c has a rule 22c. The rule 22c has a flow type information 26, forwarding destination information 27, and rule-unapplied information 28. The rule-unapplied information 28 may be a flag in an option including a rule, or a new option may be used. In the case of using the flag, if the flag is set, it indicates that the rule-unapplied information is specified, while if not set, it indicates that the rule-unapplied information is not specified. Note that when the routing rule registration message 21c is sent to the HeNB 70, a BU message including FID (Filter Identification) option can be used instead of the packet 20c.

Figure 19:
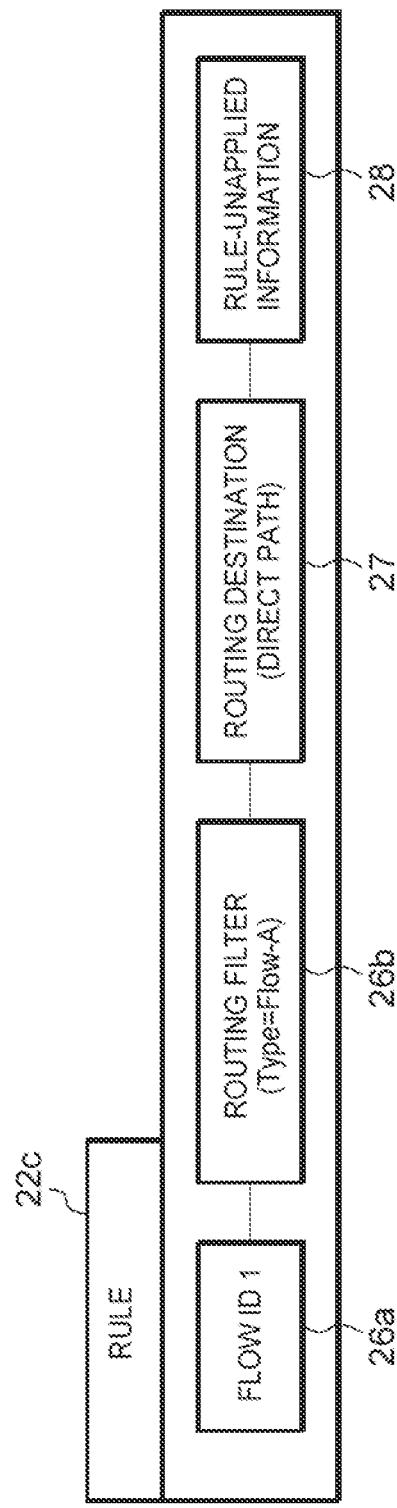
[FIG. 19] It is an explanatory drawing showing a specific example of Rule 1 in the third embodiment.

FIG. 19 shows, as an example, a routing rule registered with the HeNB 70 when the rule-unapplied information 28 is specified for the rule 22c. In this example, flow ID 1 and a routing filter (Type=Flow-A) are set respectively as pieces of flow type information 26a and 26b, and the direct path P32 is set as forwarding destination information (routing destination) 27.

Figure 20:
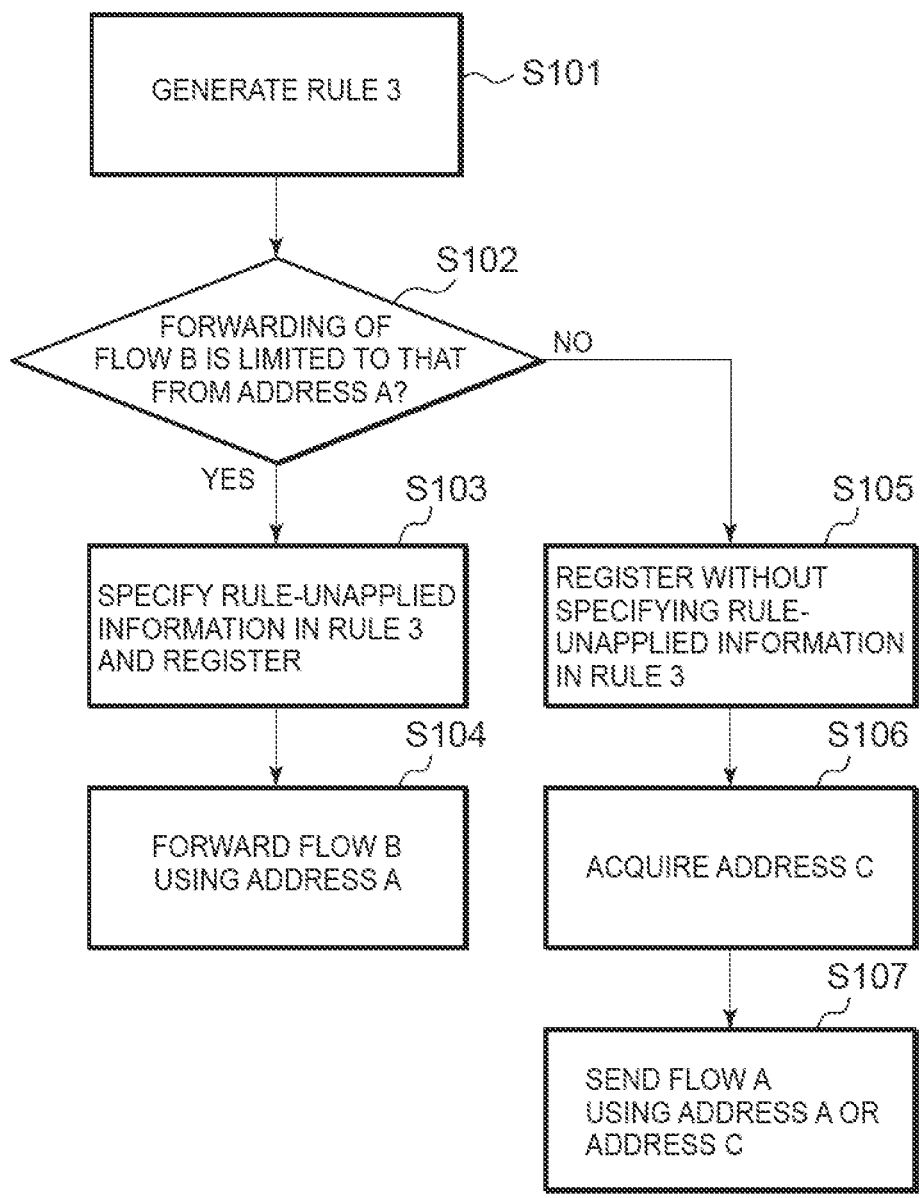
[FIG. 20] It is a flowchart for describing another example of processing performed by the UE of FIG. 15.

FIG. 20 is a flowchart showing processing when the UE 10 registers Rule 3 in Case 3 mentioned above. When generating Rule 3 in step S101, if the address used for sending flow B to the path via 3G P31 is limited to address A (YES in step S102), the UE 10 specifies the rule-unapplied information (rule to be applied only to the addresses held at the time of registration) in Rule 3, and registers it with the UE 10 itself and the HeNB 70 (step S103). On the other than, if NO in step S102, the UE 10 registers Rule 3 with the UE 10 itself and the HeNB 70 without specifying the rule-unapplied information (step S105). Since Rule 3 is applied only to address A after step S103, the UE 10 needs to use address A to send flow B (step S104). On the other hand, suppose that the UE 10 establishes a new PDN connection along the path via 3G P31 to acquire address C after step S105 (step S106). In this case, if there is a need to send flow A along the path via 3G P31 after address C is acquired, either address A or address C is used (step S107).

When the rule-unapplied information is specified in Rule 3, since Rule 3 is applied only the address A as mentioned above, the HeNB 70 can send only packets of flow B for which address A is set as the source address to the path via 3G P31. If any other rules including the default rule are not registered, all the packets to which Rule 3 is not applied are discarded by the HeNB 70. On the other hand, when no rule-unapplied information is specified in Rule 3, since Rule 3 is applied to all the addresses, the address used for sending flow B is not limited. In other words, not only address A but also address C can be used to send flow B. Note that the new PDN connection used to forward flow B to the path via 3G P31 may be established when the need to forward flow B from address C to the path via 3G P31 arises.

<HeNB>

Figure 21:
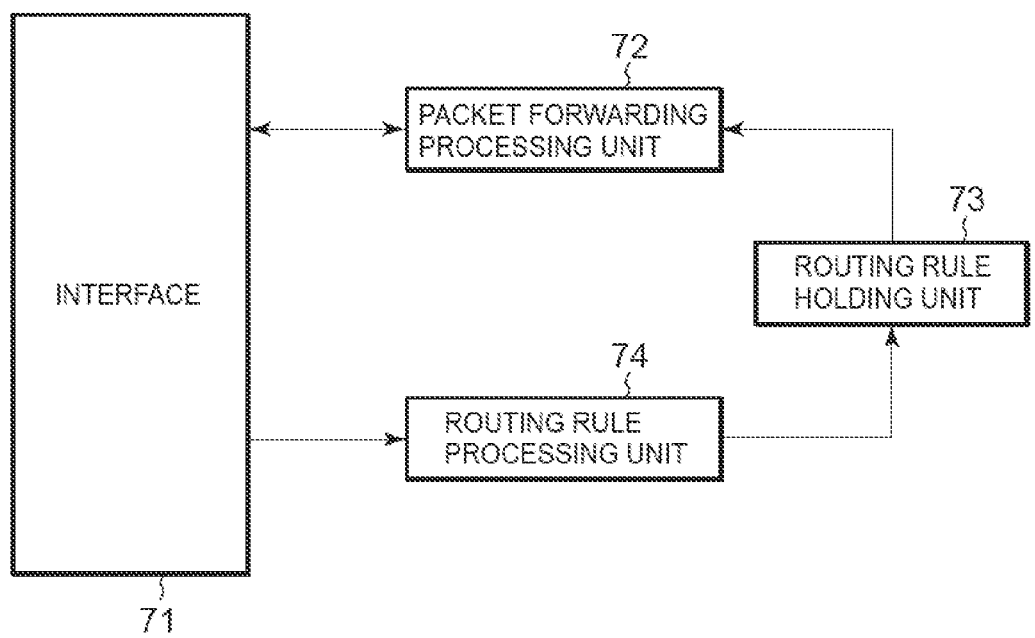
[FIG. 21] It is a block diagram showing a HeNB of FIG. 15 in detail.

FIG. 21 is a block diagram showing a configuration of the HeNB 70. The HeNB 70 has a 3GPP-compatible interface 71, a packet forwarding processing unit 72, a routing rule holding unit 73, and a routing rule processing unit 74. The routing rule processing unit 74 processes the routing rule registration message 21c received from the UE 10, and holds, in the routing rule holding unit 73, the routing rule 22c included in the message 21c together with the rule-unapplied information 28 specified. The packet forwarding processing unit 72 determines whether to forward packets sent from the UE 10.

Figure 22:
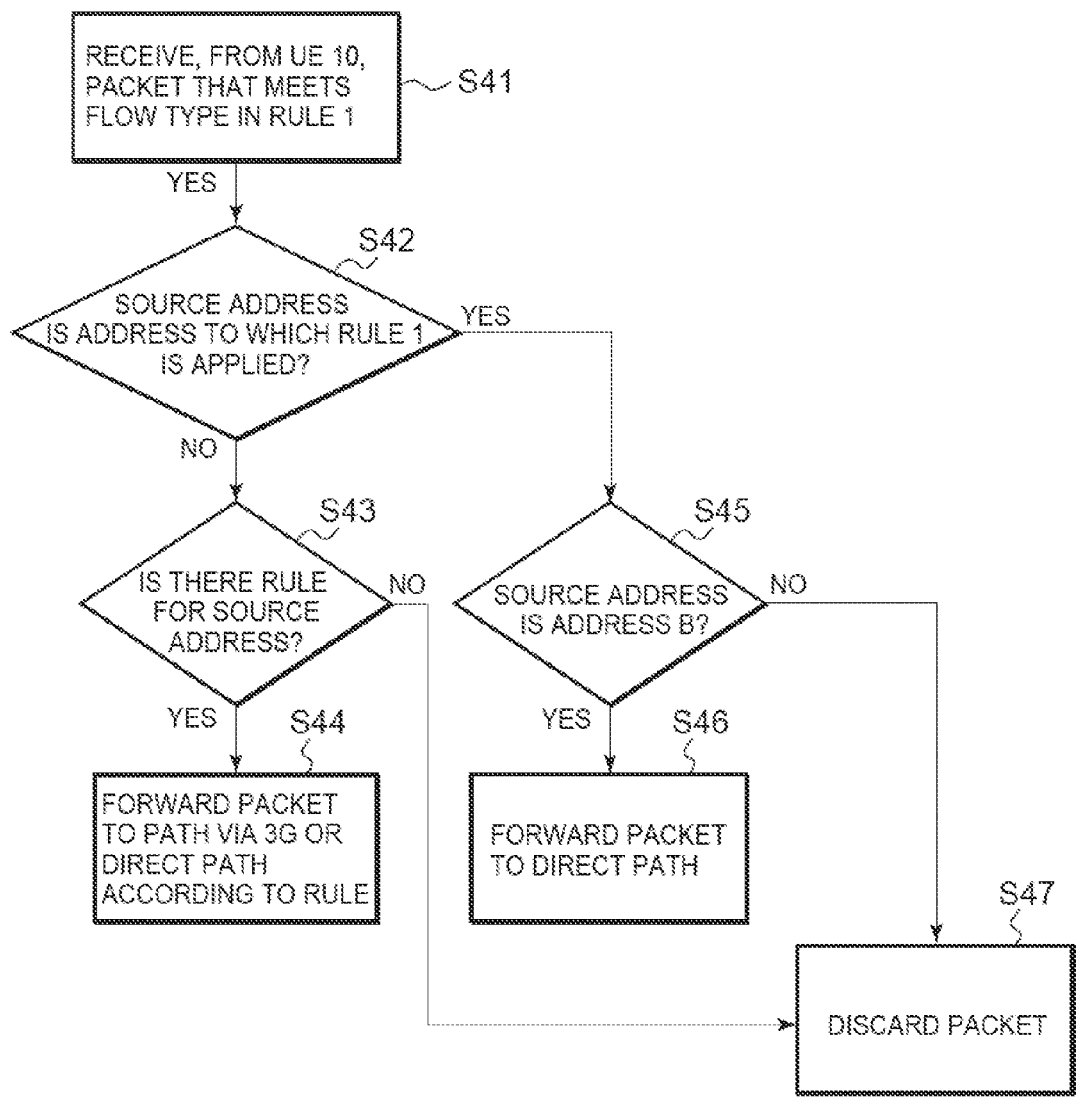
[FIG. 22] It is a flowchart for describing processing performed by the HeNB of FIG. 15.

FIG. 22 is a flowchart showing processing performed by the packet forwarding processing unit 72 when Rule 1 with the rule-unapplied information specified therein is held. When a packet that meets the flow type described in Rule 1 is received from the UE 10 (step S41), it is checked whether the packet is sent from address A or B to which Rule 1 is applied (step S42). If the packet is sent from address to which Rule 1 is not applied (NO in step S42), it is then checked whether there is a rule (Rule 1-1) for address C (step S43). If there is a rule for address C (YES in step S43), the packet is forwarded to the path via 3G P31 or the direct path P32 according to the rule (step S44). On the other hand, if there is no rule for address C (NO in step S43), the packet is discarded (step S47). Further, when the received packet is sent from address A or B to which Rule 1 is applied (YES in step S42), if the source address is address B (YES in step S45), the packet is forwarded to the direct path P32 according to Rule 1 (step S46). On the other hand, if the source address is not address B, i.e., when it is address A (NO in step 45), the packet is discarded (step S47).

Here, it is desired that the operator should determine whether to establish a new PDN connection and acquire address C. When receiving a request for establishment of a new PDN connection from the UE 10, if use of the path via 3G P31 can be permitted as the forwarding destination path for flow A, the operator establishes the new PDN connection and assigns address C. When making a request for establishment of a new PDN connection, the UE 10 may declare use of the PDN connection to forward flow A. After the new PDN connection is established and address C is assigned, when packets of flow A is to be forwarded to the path via 3G P31, the UE 10 sets address C in the packet source address and sends the packet.

Figure 23:
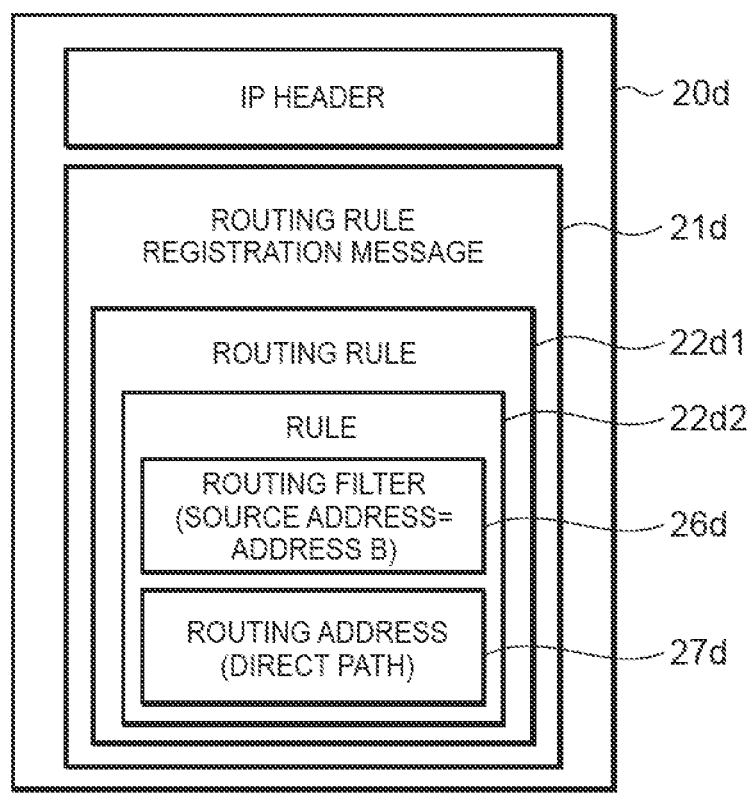
[FIG. 23] It is an explanatory drawing showing the format of the routing rule registration message in an alternative embodiment of the third embodiment.

Here, description will be made of a method of giving notice of the content of the rule-unapplied information 28 implicitly rather than explicitly from the UE 10 to the HeNB 70. FIG. 23 shows the structure of a packet 20d when the UE 10 sends the HeNB 70 a routing rule registration message 21d. The message 21d has a routing rule 22d1, and in the routing rule 22d1, flow identification information (routing filter) 26d and forwarding destination information (routing address) 27d are described as a rule 22d2. As mentioned above, the content of the packet sent from the UE 10, which is to be checked by the HeNB 70, is whether the packet source address is address A or B corresponding to the forwarding destination path P31 or P32 specified in the routing rule. In other words, since the source address A or B to be set for the packet is obvious from the forwarding destination path P31 or P32 in the routing rule, there is usually no need to specify the source address (destination address in the case of a downlink packet) in the flow identification information.

Therefore, as a method of specifying the content of the rule-unapplied information 28 implicitly, when address B is described as the source address in the routing filter 26d (flow identification information) as shown in FIG. 23, it is indicated that rule-unapplied information is set in the routing rule, while when it is not described, the routing filter 26d indicates that no rule-unapplied information is set. This can eliminate the need to define a new option or field, or a flag, as shown in FIG. 18 or FIG. 19, for explicitly specifying the content of the rule-unapplied information 28, thereby minimizing the impact on the UE 10 and the HeNB 70. Further, since the presence or absence of specification of the rule-unapplied information is indicated, a flow ID corresponding to both the cases of specifying and not specifying the rule-unapplied information may be set up to include either of them in the routing rule registration message 21d.

As described above, according to the third embodiment, the address applied to a routing rule to be registered with the HeNB 70 can be limited to an address held at the time of address registration. Further, after the registration, a rule for a new address acquired on the path via 3G P31 can be registered separately. Therefore, the UE 10 can immediately forward, to the path via 3G P31, any packet of flow A to be forwarded using the path via 3G P31.

Each functional block used in the explanations of the aforementioned embodiments can be realized as a LSI that is typically an integrated circuit. Each functional block can be individually formed into a single chip. Alternatively, some or all of the functional blocks can be included and formed into a single chip. Although referred to here as the LSI, depending on differences in integration, the integrated circuit can be referred to as the IC, a system LSI, a super LSI, or an ultra LSI. The method of forming the integrated circuit is not limited to LSI, and can be actualized by a dedicated circuit or a general-purpose processor. An FPGA (Field Programmable Gate Array) that can be programmed after LSI manufacturing or a reconfigurable processor of which connections and settings of the circuit cells within the LSI can be reconfigured can be used. Furthermore, if a technology for forming the integrated circuit that can replace LSI is introduced as a result of the advancement of semiconductor technology or a different derivative technology, the integration of the functional blocks can naturally be performed using the technology. For example, the application of biotechnology is a possibility.

INDUSTRIAL APPLICABILITY

When a mobile node having multiple interfaces uses a second address generated from a home network prefix in addition to a home address generated from the home network prefix, the present invention has the advantage of being able to register, with a home agent, a routing rule for specifying packets destined to the second address and a flow forwarding destination interface without increasing the number of messages. This can be used for 3GPP and the like.

The present invention also has the advantage of being able to set an application condition of a routing rule when a routing device that has received packets sent from a mobile node or packets destined to the mobile node forwards the packets selectively to a first path side or a second path side according to the routing rule in which the forwarding destination of the flow is specified. This can also be used for 3GPP and the like.

In addition, the present invention has the advantage of being able to set an application condition of a routing rule when a home base station that has received packets sent from a mobile node forwards the packets selectively to a first path side or a second path side according to the routing rule in which the forwarding destination of the flow is specified. This can be used for 3GPP and the like as well.

The invention claimed is:

1. A routing method comprising:
a step of providing a mobile node, wherein the mobile node is capable of simultaneously establishing connections to first and second networks through at least first and second interfaces;
a step of providing a home address generated from a home network prefix for the first network and a second address generated from the home network prefix for the second network;
a step, by the mobile node, at a time of starting simultaneous connections to the first and second networks, of generating a routing rule for specifying a forwarding destination interface of athe packet destined for the second address when the mobile node is connected to the first and second networks at the same time through the respective first and second interfaces, the mobile node registering the generated routing rule with a home agent for the mobile node; and
a step, by the home agent, of forwarding the packet originally destined for the second address and/or a flow of the packets to the forwarding destination interface based on the routing rule generated by the mobile node.

2. The routing method according to claim 1, further comprising:
a step, by the mobile node, of registering, with the home agent at the time of starting the simultaneous connections, a routing rule for specifying a forwarding destination interface of a packet destined for the home address when the mobile node is connected to the first and second networks at the same time; and
a step, by the home agent, of forwarding the packet originally destined for the home address and/or a flow of the packets to the forwarding destination interface based on the routing rule.

3. The routing method according to claim 1, wherein the routing rule includes information for prohibiting forwarding of the packet destined for the second address.

4. The routing method according to claim 1, wherein an application condition of the routing rule can be set.

5. The routing method according to claim 4, wherein the mobile node generates the application condition in addition to the routing rule, wherein the application condition specifies whether the routing rule is applied.

6. The routing method according to claim 1, wherein the routing rule includes applicability information indicative of whether the routing rule is to be applied to the second address which is not the home address.

7. A routing system comprising:
a mobile node capable of simultaneously establishing connections to first and second networks through at least first and second interfaces, the mobile node including a routing rule generator for generating a routing rule when the mobile node is simultaneously connected to the first and second network and when the mobile node uses a second address generated from a home network prefix in addition to a home address generated from the home network prefix, the routing rule specifying a flow a forwarding destination interface of a packet destined for the second address when the two or more of the interfaces are connected to first and second networks at the same time;
a unit in the mobile node configured to register the routing rule with a home agent of the mobile node at a time of starting simultaneous connections to the first and second networks; and
a unit in the home agent configured to forward the packet originally destined for the second address and/or a flow of the packets to the forwarding destination interface based on the routing rule generated in the mobile node rule generator.

8. The routing system according to claim 7, further comprising:
a unit in the mobile node configured to register, with the home agent at the time of starting the simultaneous connections, a routing rule for specifying a forwarding destination interface of a packet destined for the home address when the two or more of the interfaces are connected to the first and second networks at the same time; and
a unit in the home agent configured to forward the packet originally destined for the home address and/or a flow of the packets to the forwarding destination interface based on the routing rule.

9. The routing system according to claim 7, wherein the routing rule includes information for prohibiting forwarding of the packet destined for the second address.

10. The routing system according to claim 7, further comprising a unit in the mobile node configured to set an application condition of the routing rule.

11. The routing system according to claim 10, wherein the mobile node generates the application condition in addition to the routing rule, wherein the application condition specifies whether the routing rule is applied.

12. The routing system according to claim 7, wherein the routing rule includes applicability information indicative of whether the routing rule is to be applied to the second address which is not the home address.

13. A mobile node in a routing system capable of supporting at least two interfaces to at least two networks, at least one interface using a home address generated from a home network prefix and at least a second interface using a second address generated from the home network prefix, the mobile node comprising:
 a unit within the mobile node configured to generate and to register a routing rule with a home agent of the mobile node at a time of starting simultaneous connections using the at least two interfaces, the routing rule specifying a forwarding destination interface of a packet destined for the second address when two or more of the interfaces are connected to at least two networks at the same time.

14. The mobile node according to claim 13, further comprising
 a unit configured to register, with the home agent at the time of starting the simultaneous connections, a routing rule for specifying a forwarding destination interface of a packet destined for the home address when the at least two interfaces are connected to the at least two networks at the same time.

15. The mobile node according to claim 13, wherein the routing rule includes information for prohibiting forwarding of the packet destined for the second address.

16. The mobile node according to claim 13, further comprising a unit in the mobile node configured to set an application condition of the routing rule.

17. The mobile node according to claim 16, wherein the mobile node generates the application condition in addition to the routing rule, wherein the application condition specifies whether the routing rule is applied.

18. The mobile node according to claim 13, wherein the routing rule includes applicability information indicative of whether the routing rule is to be applied to the second address which is not the home address.

19. A home agent of a mobile node in a routing system in which the mobile node that supports a plurality of interfaces uses a second address generated from a home network prefix in addition to a home address generated from the home network prefix, the home agent comprising:
 a routing rule registration unit and routing rule holding unit for receiving a routing rule generated by the mobile node at a time of starting simultaneous connections the routing rule specifying a forwarding destination interface of a packet destined for the second address when two or more of the plurality of interfaces are connected to different networks at the same time; and
 a packet forwarding processing unit for forwarding the packet originally destined for the second address and/or a flow of the packets to the forwarding destination interface based on the routing rule.

20. The home agent according to claim 19, further comprising:
 a routing rule registration unit and routing rule holding unit for receiving a routing rule generated by the mobile node at a time of starting simultaneous connections the routing rule specifying a forwarding destination interface of a packet destined for the home address when the two or more of the plurality of interfaces are connected to different networks at the same time; and
 a packet forwarding processing unit for forwarding the packet originally destined for the home address and/or a flow of the packets to the forwarding destination interface based on the routing rule.

21. The home agent according to claim 19, wherein the routing rule includes information for prohibiting forwarding of the packet destined for the second address.

22. The home agent according to claim 19, further comprising a unit configured to set an application condition of the routing rule.

23. The home agent according to claim 22, wherein the application condition specifies whether the routing rule is applied.

24. The home agent according to claim 19, wherein the routing rule includes applicability information indicative of whether the routing rule is to be applied to the second address which is not the home address.

25. A routing method in which a home e Node B that has received a packet sent from a mobile node forwards the packet selectively to a first path side or a second path side according to a routing rule generated in the mobile node in which a forwarding destination of a flow is specified, the method comprising:
 a step of causing the mobile node to register, with the home e Node B together with the routing rule, an application condition for specifying whether the routing rule is applied to a packet related to the flow whose address acquired after registration of the routing rule is a source address;
 a step of causing the home e Node B to forward the received packet selectively to the first path side or the second path side according to the routing rule only when the application condition permits the routing rule after the packet related to the flow whose address is the source address is received; and
 a step of causing the mobile node to register, with the home e Node B, a new routing rule generated in the mobile node to be applied to the packet related to the flow whose address is the source address when the application condition does not permit the application of the routing rule.

26. The routing method according to claim 25, further comprising
 a step of causing the home e Node B to check whether the source address is a valid address when receiving the packet related to the flow whose address is the source address,
 wherein in the forwarding step, when the source address is an address valid on the first path, the packet is forwarded to the first path, while when the source address is an address valid on the second path, the packet is forwarded to the second path.

27. The routing method according to claim 25, wherein the first path is a path via a home network of the mobile node, and the second path is a direct path without taking a route via the home network.

28. The routing method according to claim 25, wherein
 the application condition specifies that the routing rule is not applied to a packet related to the flow whose address is acquired after registration of the routing rule.

* * * * *